(12) United States Patent
Shimatani

(10) Patent No.: US 8,810,823 B2
(45) Date of Patent: Aug. 19, 2014

(54) IMAGE READING DEVICE, AN IMAGE FORMING APPARATUS, AND METHODS FOR DETECTING DIRT IN DOCUMENT READING POSITIONS

(71) Applicant: KYOCERA Document Solutions Inc., Osaka (JP)

(72) Inventor: Akira Shimatani, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 13/868,795

(22) Filed: Apr. 23, 2013

(65) Prior Publication Data
US 2013/0278955 A1 Oct. 24, 2013

(30) Foreign Application Priority Data
Apr. 23, 2012 (JP) .................... 2012-098226

(51) Int. Cl.
  G06F 3/12 (2006.01)
  G06F 15/00 (2006.01)
  G06K 1/00 (2006.01)
  H04N 1/40 (2006.01)
  H04N 1/04 (2006.01)
  H04N 1/409 (2006.01)

(52) U.S. Cl.
  CPC .................. *H04N 1/4097* (2013.01)
  USPC ............ 358/1.13; 358/1.9; 358/461; 358/474

(58) Field of Classification Search
  None
  See application file for complete search history.

(56) References Cited

U.S. PATENT DOCUMENTS

| | | | |
|---|---|---|---|
| 2003/0053140 A1* | 3/2003 | Kakutani | 358/302 |
| 2003/0090742 A1 | 5/2003 | Fukuda et al. | |
| 2005/0185224 A1* | 8/2005 | Yoshizawa | 358/3.26 |
| 2006/0023267 A1* | 2/2006 | Ikeno et al. | 358/474 |
| 2006/0103898 A1* | 5/2006 | Okawa | 358/498 |
| 2008/0252941 A1* | 10/2008 | Hashizume | 358/474 |
| 2011/0002015 A1* | 1/2011 | Hayakawa et al. | 358/448 |
| 2011/0013241 A1* | 1/2011 | Ohara | 358/518 |
| 2011/0019248 A1* | 1/2011 | Tachikawa | 358/498 |
| 2011/0181919 A1* | 7/2011 | Okutsu | 358/448 |

FOREIGN PATENT DOCUMENTS

| | | |
|---|---|---|
| JP | 2000-310820 | 11/2000 |
| JP | 2002-158835 | 5/2002 |
| JP | 2003-101737 | 4/2003 |
| JP | 2008-028684 | 2/2008 |

* cited by examiner

*Primary Examiner* — Ming Hon
(74) *Attorney, Agent, or Firm* — McDonnell Boehnen Hulbert & Berghoff LLP

(57) ABSTRACT

An image reading device includes a changed-pixel detection unit and a determination unit. The changed-pixel detection unit detects, from image data read by the image reading unit, a changed pixel having a pixel value that differs from that of an adjacent pixel in the main scanning direction. The pixel value may differ by more than a predetermined value. The changed-pixel detection unit detects the position of the changed pixel in the main scanning direction. The determination unit determines that image data corresponding to positions of the changed pixel for the image data obtained by reading the document corresponds to a foreign image. The positions are consecutive in the sub-scanning direction. The positions of the changed pixel are detected for the image data obtained by reading the document and the image data obtained by reading the white guide member.

20 Claims, 11 Drawing Sheets

IMAGE READING DEVICE, AN IMAGE FORMING APPARATUS, AND METHODS FOR DETECTING DIRT IN DOCUMENT READING POSITIONS

INCORPORATION BY REFERENCE

This application is based upon and claims the benefit of priority from corresponding Japanese Patent Application No. 2012-098226 filed in the Japan Patent Office on Apr. 23, 2012, the entire contents of which are incorporated herein by reference.

BACKGROUND

Unless otherwise indicated herein, the materials described in this section are not necessarily prior art to the claims in this application and are not admitted to be prior art by inclusion in this section. The disclosure herein relates to an image reading device and an image forming apparatus, and more specifically to a technology for detecting dirt in a document reading position.

Image reading devices called sheet-through devices may be configured to read a document conveyed to a document reading position by a document conveying unit. In some instances, the document may be read through a document glass disposed in the document reading position by using an image reading unit such as a scanner. In image reading devices of this type, dirt such as dust on the document glass may appear as vertical stripes on an image read by the image reading unit, possibly resulting in a defective image produced. The following four techniques for detecting dirt on a document glass are available.

The first technique is a technique for detecting a defective pixel. Detecting the defective pixel may be based on image data obtained by reading a white reference plate and image data obtained by reading a black reference plate through a document glass on which no document is placed.

The second technique is a technique in which a conveyed document is read at different positions in the sub-scanning direction to obtain image data. As such, it may be determined that dirt is present on the document glass if a pixel and an adjacent pixel have significantly different pixel values. Different pixel values may be detected in image data obtained at the leading end of the document and image data obtained at the trailing end of the document.

The third technique is a technique for detecting dirt on the document glass by using an image reading unit that simultaneously reads a plurality of lines.

The fourth technique is a technique for detecting dirt on the document glass by using a color line sensor as an image reading unit.

In the first technique, however, it is difficult to determine whether a defective pixel is caused by dust deposited on a document glass or a guide plate. In the second technique, it is possible to detect dirt arising from dust deposited on the document glass. However, the detectable dirt is limited to dirt arising from dust deposited on the document glass and it is difficult to detect dirt arising from floating dust moving over the document glass.

In the third and fourth techniques, it is also difficult to detect dirt arising from floating dust moving over the document glass. Additionally, the third and fourth techniques are difficult to implement with a monochrome line sensor or a contact image sensor (CIS) configured to read a color image by sequentially switching colors of a light source. Thus, a line sensor may be required such as a color charge-coupled device (CCD) sensor configured to simultaneously read three colors or a line sensor used for dust detection, which may be configured to simultaneously read a plurality of lines. Hence, image reading devices that apply the third and fourth techniques are expensive.

SUMMARY

An aspect of the disclosure provides an image reading device including an image reading unit, a white guide member, a document conveying unit, a changed-pixel detection unit, and a determination unit. The image reading unit optically reads, on a line-by-line basis, a document at a predetermined document reading position through a document glass. Each line extends in a main scanning direction. The white guide member is disposed at the document reading position so as to face the document glass, and is read by the image reading unit. The document conveying unit conveys the document toward the document reading position, and directs the document to travel between the white guide member and the document glass. The changed-pixel detection unit, based on image data read by the image reading unit, is configured to detect: (a) a changed pixel with a pixel value that differs from a pixel value of an adjacent pixel in the main scanning direction by more than a predetermined value, and (b) a position of the changed pixel in the main scanning direction. The determination unit determines, based on the position of the changed pixel in the main scanning direction, whether or not positions of the changed pixel are consecutive in a sub-scanning direction for: (a) image data obtained by reading the document conveyed by the document conveying unit, and (b) image data obtained by reading the white guide member immediately before or after reading the document. When the determination unit determines that the positions of the changed pixel are consecutive in the sub-scanning direction, the determination unit determines that the positions of the changed pixel correspond to a foreign image. The positions of the changed pixel are detected from the image data obtained by reading the document and the image data obtained by reading the white guide member.

Another aspect of the disclosure provides an image forming apparatus including an image reading device that reads a document to generate image data, and an image forming unit that forms an image of the image data obtained by reading the document using the image reading device. The image reading device includes an image reading unit, a white guide member, a document conveying unit, a changed-pixel detection unit, and a determination unit. The image reading unit optically reads, on a line-by-line basis, the document at a predetermined document reading position through a document glass, where each line extends in a main scanning direction. The white guide member is disposed at the document reading position so as to face the document glass, and is read by the image reading unit. The document conveying unit conveys the document toward the document reading position, and directs the document to travel between the white guide member and the document glass. The changed-pixel detection unit, based on the image data read by the image reading unit is configured to detect: (a) a changed pixel with a pixel value that differs from a pixel value of an adjacent pixel in the main scanning direction by more than a predetermined value, and (b) a position of the changed pixel in the main scanning direction. The determination unit determines, based on the position of the changed pixel in the main scanning direction, whether or not positions of the changed pixel are consecutive in a sub-scanning direction for: (a) the image data obtained by reading the document conveyed by the document conveying unit and (b) image data obtained by reading the white guide member immediately before or after reading the document. When the determination unit determines that the positions of the changed pixel are consecutive in the sub-scanning direction, the determination unit determines that the positions of the changed pixel correspond to a foreign image. The positions of the changed pixel are detected from the image data obtained by reading the document and the image data obtained by reading the white guide member.

Another aspect of the disclosure provides a computer-implemented method. The method includes reading, on a line-by-line basis, a document at a predetermined document reading position through a document glass, where each line extends in a main scanning direction. Further, the method includes disposing a white guide member at the document reading position so as to face the document glass, where the white guide member is read. Yet further, the method includes conveying the document toward the document reading position, where the document is directed to travel between the white guide member and the document glass. Based on image data obtained from reading the document, the method further includes detecting: (a) a changed pixel with a pixel value that differs from a pixel value of an adjacent pixel in the main scanning direction by more than a predetermined value, and (b) a position of the changed pixel in the main scanning direction. Based on the position of the changed pixel in the main scanning direction, the method further includes determining whether or not positions of the changed pixel are consecutive in a sub-scanning direction for: (a) the image data obtained by reading the document, and (b) image data obtained by reading the white guide member immediately before or after reading the document. In addition, when the positions of the changed pixel are consecutive in the sub-scanning direction, the positions of the changed pixel are determined to correspond to a foreign image. Further, the positions of the changed pixel are detected from the image data obtained by reading the document and the image data obtained by reading the white guide member.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
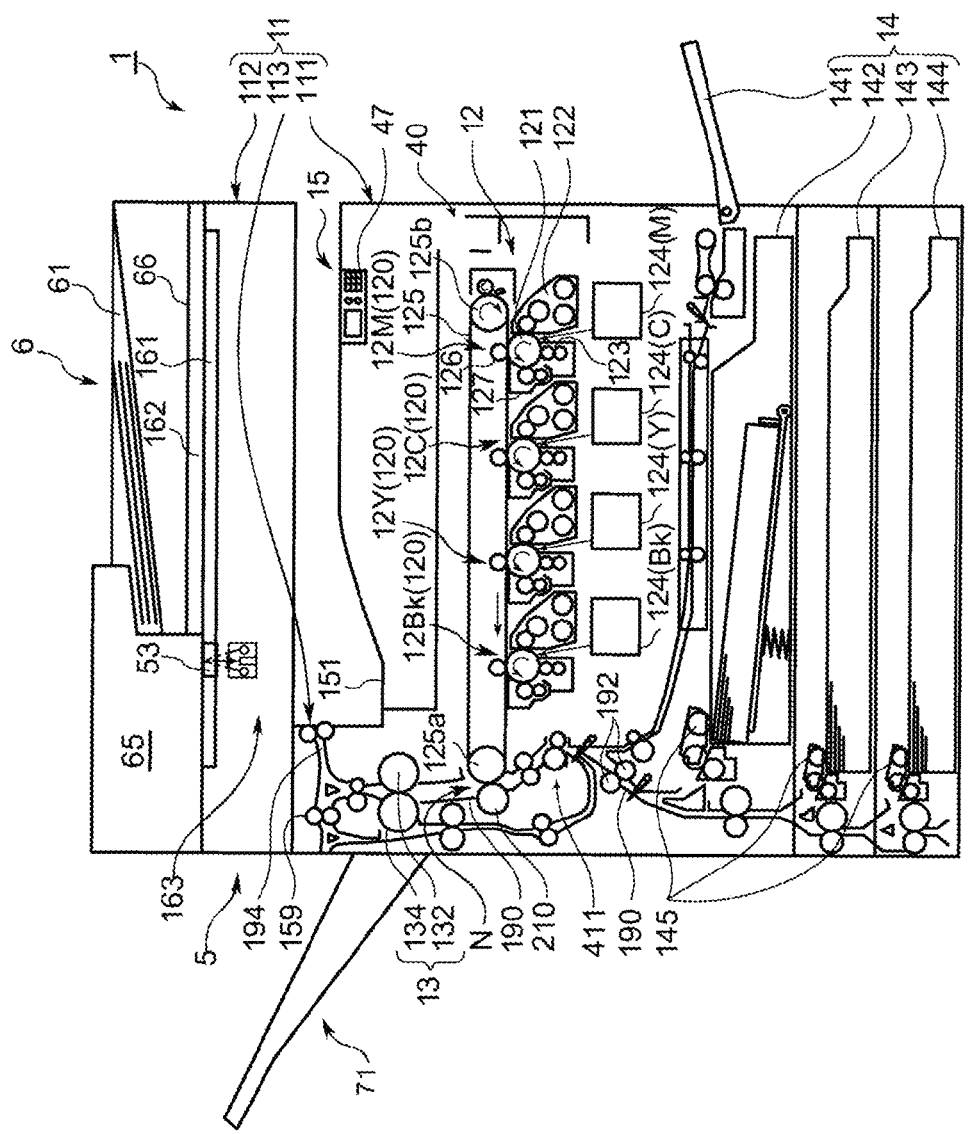
FIG. 1 is a front cross-sectional view illustrating the structure of an image forming apparatus according to an embodiment of the disclosure.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

An image reading device and an image forming apparatus according to embodiments of the disclosure will be described hereinafter with reference to the drawings. FIG. 1 is a front cross-sectional view illustrating the structure of an image forming apparatus according to an embodiment of the disclosure.

An image forming apparatus 1 as an electronic apparatus according to an embodiment of the disclosure may be, for example, a multi-function peripheral having a plurality of functions. For example, the plurality of functions may include a copying function, a printer function, a scanner function, and a facsimile function. The image forming apparatus 1 has an apparatus body 11 including an image forming unit 12, a fixing unit 13, a sheet feeding unit 14, a document conveying unit 6, and an image reading unit 5, and so forth.

The apparatus body 11 includes a lower body 111, an upper body 112 disposed above the lower body 111 so as to face the lower body 111, and a connecting portion 113 located between the upper body 112 and the lower body 111. The upper body 112 has the image reading unit 5 and the document conveying unit 6.

The image reading unit 5 includes a contact glass 161 which is placed in an opening of a top surface of the upper body 112 on which a document is to be placed. Further, a document holding cover 162 may be opened or closed to hold a document placed on the contact glass 161. Yet further, a reading mechanism 163 may be configured to read a document placed on the contact glass 161. In this embodiment, the reading mechanism 163 may be a CIS-type image reading mechanism. The reading mechanism 163 of the CIS-type projects light from light emitting diodes (LEDs). As such, light from three different colors, for example, red, green, and blue, are projected onto a document while switching between the light of the LEDs. The reading mechanism 163 receives light reflected from the document by using a complementary metal oxide semiconductor (CMOS) image sensor through a rod lens array to generate image data in the CMOS image sensor. The reading mechanism 163 reads objects on a line-by-line basis, where each line extends in the main scanning direction. Further, the reading mechanism 163 acquires image data. In the following, a description will be given of a case where the reading mechanism 163 reads the object to be read on a line by line basis. The image data generated by the reading mechanism 163 may be used by the image forming unit 12 to form an image or may be saved in a hard disk drive (HDD) 92 described below. The configuration of the reading mechanism 163 is not limited to the descriptions above. The reading mechanism 163 may be an image reading mechanism including a monochrome sensor and so forth.

Feed roller and a conveyor roller are rotated such that the document conveying unit 6 feeds documents set on a document set tray 61. Documents are fed one by one and each individual document is conveyed to a position facing a document reading slit 53. The reading mechanism 163 of the image reading unit 5 is then capable of reading the documents through the document reading slit 53. When reading a document conveyed by the document conveying unit 6, the reading mechanism 163 reads the document conveyed by the document conveying unit 6 at a document reading position located at the position corresponding to the document reading slit 53. In addition, the document reading slit 53 has a document glass 530 (see FIG. 2), and the reading mechanism 163 reads a document conveyed by the document conveying unit 6 at the document reading position through the document glass 530.

The lower body 111 includes the image forming unit 12, the fixing unit 13, and the sheet feeding unit 14. The sheet feeding unit 14 includes sheet feeding cassettes 142, 143, and 144, which are inserted to the apparatus body 11 and are removable from body 11.

The image forming unit 12 performs an image forming operation to form toner images on a recording sheet fed from the sheet feeding unit 14. The image forming unit 12 includes an intermediate transfer belt 125 stretched across a plurality of rollers including a drive roller 125a so that the intermediate transfer belt 125 can travel in the sub-scanning direction for forming an image. Further, a magenta image forming unit 12M uses a magenta color toner, a cyan image forming unit 12C uses a cyan color toner, a yellow image forming unit 12Y uses a yellow color toner, a black image forming unit 12Bk uses a black color toner, and a secondary transfer roller 210 makes contact with the outer peripheral surface of the intermediate transfer belt 125. The magenta image forming unit 12M, the cyan image forming unit 12C, the yellow image forming unit 12Y, and the black image forming unit 12Bk are sequentially disposed from upstream to downstream in the travel direction of the intermediate transfer belt 125, and are each hereinafter referred to as "the image forming unit 120" unless they are individually identified.

Each of the image forming units 120 includes a photosensitive drum 121, a developing device 122 that supplies toner to the photosensitive drum 121, a toner cartridge (not illustrated) that contains the toner, a charging device 123, an exposure device 124, a primary transfer roller 126, and a drum cleaning device 127.

On a peripheral surface of the photosensitive drum (image bearing member) 121, an electrostatic latent image is formed, and then a toner image corresponding to the electrostatic latent image is formed. The developing device 122 supplies toner to the photosensitive drum 121. The developing device 122 is supplied with toner corresponding to the toner cartridge, if necessary.

The charging device 123 is disposed at position immediately below the photosensitive drum 121. The charging device 123 uniformly charges the peripheral surface corresponding to the photosensitive drum 121 in accordance with predetermined charging specifications.

The exposure device 124 is disposed below the photosensitive drum 121 and further below the charging device 123. The exposure device 124 irradiates the charged peripheral surface corresponding to the photosensitive drum 121 with laser lighting. The laser lighting is associated with the color based on image data input from a computer or image data acquired by the image reading unit 5 to form an electrostatic latent image on the peripheral surface of the photosensitive drum 121. The exposure device 124 includes a laser light source that outputs a laser beam, a polygon mirror from which the laser beam is reflected toward the surface corresponding to the photosensitive drum 121, and optical components including lenses and mirrors to direct the laser light reflected by the polygon mirror to the photosensitive drum 121.

The developing device 122 supplies toner to the electrostatic latent image on the peripheral surface of the photosensitive drum 121. Further, the photosensitive drum 121 rotates in the direction indicated by arrows in FIG. 1 to deposit the toner and forms toner image corresponding to the image data on the peripheral surface of the photosensitive drum 121.

The intermediate transfer belt 125 is disposed at a position above the photosensitive drums 121. The intermediate transfer belt 125 is stretched between the drive roller 125a illustrated in the left part of FIG. 1 and a driven roller 125b illustrated in the right part of FIG. 1. Further, the lower outer peripheral surface of the intermediate transfer belt 125 makes contact with the peripheral surfaces of the photosensitive drums 121. The driven roller 125b is disposed at a position facing the drive roller 125a, and rotates clockwise in the same direction as drive roller 125a and intermediate transfer belt 125. The intermediate transfer belt 125 is driven by the drive roller 125a while sustaining contact with the peripheral surfaces of the photosensitive drums 121. The outer peripheral surface of the intermediate transfer belt 125 has an image bearing surface onto which toner images are transferred. The intermediate transfer belt 125 travels between the drive roller 125a and the driven roller 125b while synchronized with the photosensitive drums 121.

The primary transfer rollers 126 are disposed at positions facing the photosensitive drums 121 with the intermediate transfer belt 125 interposed in between. A transfer bias is applied to each of the primary transfer rollers 126 by a transfer bias applying mechanism (not illustrated). Each of the primary transfer rollers 126 transfers the toner images formed on the outer peripheral surfaces of the photosensitive drums 121 onto the surface of the intermediate transfer belt 125.

A controller 100 (see FIG. 3) controls the driving of the primary transfer rollers 126 and the image forming units 120 for each color to transfer toner images. Controller 100 controls the toner image of magenta formed by the magenta image forming unit 12M, the toner image of cyan formed by the cyan image forming unit 12C, the toner image of yellow formed by the yellow image forming unit 12Y, and the toner image of black formed by the black image forming unit 12Bk. The controller 100 controls the toner images formed onto the surface of the intermediate transfer belt 125 in such a manner that the toner images of the individual colors are superimposed on one another, thereby forming color toner images on the surface of the intermediate transfer belt 125 (intermediate transfer (primary transfer)).

The secondary transfer roller 210 is applied with a transfer bias (not illustrated). The secondary transfer roller 210 transfers the color toner images formed on the surface of the intermediate transfer belt 125 onto a recording sheet conveyed by the sheet feeding unit 14. A nip portion N is formed between the secondary transfer roller 210 and the drive roller 125a with the intermediate transfer belt 125 interposed in between. In the nip portion N, the toner images are transferred onto the recording sheet by secondary transfer. A recording sheet conveyed along a sheet conveying path 190 is pressed and held between the intermediate transfer belt 125 and the secondary transfer roller 210 at the nip portion N, and thereby the toner images on the intermediate transfer belt 125 are transferred onto the recording sheet by secondary transfer.

The drum cleaning device 127 is disposed at position on the left of the photosensitive drum 121 in FIG. 1. Further, the drum cleaning device 127 cleans the peripheral surface of the photosensitive drum 121 by removing residual toner therefrom.

The sheet conveying path 190 is formed at a position on the left of the image forming unit 12 in FIG. 1 so as to extend in the up-down direction in FIG. 1. Conveyor roller pairs 192 are located in positions on the sheet conveying path 190. The conveyor roller pairs 192 convey a recording sheet fed by the sheet feeding unit 14 toward the nip portion N and the fixing unit 13. As such, the recording sheet is conveyed by a conveyance mechanism including the conveyor roller pairs 192 at the appropriate positions.

The fixing unit 13 includes a heating roller 132 and a pressing roller 134 disposed so as to face the heating roller 132. The heating roller 132 has a heat generator that serves as a heat source and generates heat when supplied with electric power. The fixing unit 13 performs a fixing process by applying heat from the heating roller 132 to the toner images transferred onto a recording sheet by the image forming unit 12. Further, the fixing process is performed while the recording sheet is traveling through a fixing nip portion between the heating roller 132 and the pressing roller 134. The recording sheet on which a color image has been formed after completion of the fixing process is discharged toward a discharge tray 151 along a sheet discharge conveying path 194 from above the fixing unit 13. The discharge tray 151 is disposed on the top of the lower body 111.

The sheet feeding unit 14 includes a manual feed tray 141 that may be opened or closed, and is further disposed on the right sidewall of the apparatus body 11 in FIG. 1 along with the sheet feeding cassettes 142, 143, and 144. Pickup rollers 145 disposed above the sheet feeding cassettes 142, 143, and 144 feed the recording sheets on the top of the bundles of sheets received in the sheet feeding cassettes 142, 143, and 144 toward the sheet conveying path 190.

A sheet discharge unit 15 is formed between the lower body 111 and the upper body 112. The sheet discharge unit 15 includes the discharge tray 151, which is positioned on the upper surface of the lower body 111. The discharge tray 151 is a tray to which a recording sheet is discharged. The recording sheet may have toner images formed by the image forming unit 12 and may be discharged after being subjected to the fixing process by the fixing unit 13.

Figure 2:
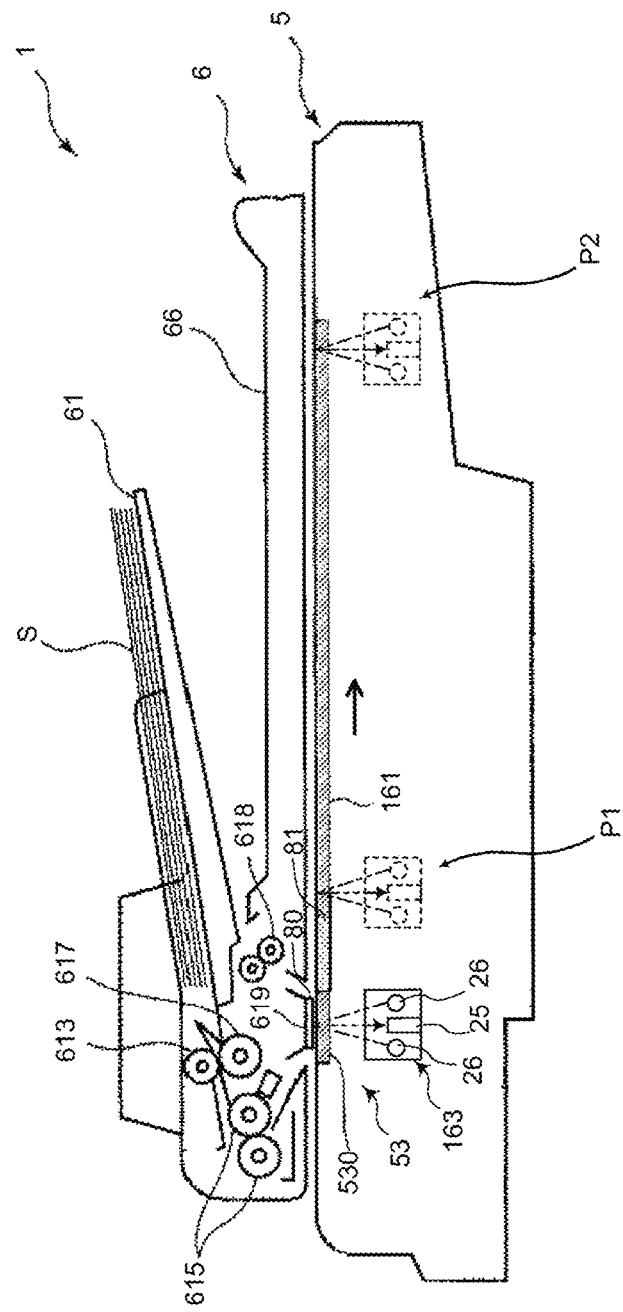
FIG. 2 is a side view illustrating the schematic configuration of a document conveying unit and an image reading unit.

The document conveying unit 6 and the image reading unit 5, described above, will now be described in more detail. FIG. 2 is a side view illustrating the schematic configuration of the document conveying unit 6 and the image reading unit 5.

The image reading unit 5 reads a document set on the contact glass 161 or a document conveyed to the document reading position by the document conveying unit 6.

When the image reading unit 5 reads a document conveyed by the document conveying unit 6, the reading mechanism 163 moves to the document reading position (the position indicated by a solid line in FIG. 2). The document reading position is located below the document glass (contact glass) 530 in the document reading slit 53 under control of the controller 100. In the document conveying unit 6, under the driving control of the controller 100 (see FIG. 3), a plurality of documents S set on the document set tray 61 are sequentially separated one by one by a feed roller 613 and a separation roller 617, which are disposed as a pair. One separated document S is conveyed by a pair of registration rollers 615 toward the document reading position, and travels between a white guide member 80 mounted on a document pressing member 619 at the document reading position and the document glass 530. The document glass 530 is disposed at a position facing the white guide member 80.

When the document S travels through the document reading slit 53, the reading mechanism 163 reads an image on the document surface on the document glass 530 side of the document reading slit 53. At this time, LEDs 26 of the reading mechanism 163 are controlled by the controller 100 to emit light, and the light emitted from the LEDs 26 is transmitted through the document glass 530 in the document reading slit 53 and is applied to the document S. As a result, reflected light from the document portion located at the position of the document reading slit 53 travels to CMOS image sensors 25. The CMOS image sensors 25 are controlled by the controller 100, and convert the incident light into electrical signals. The CMOS image sensors 25 are arranged in the main scanning direction, which is a direction perpendicular to the document conveying direction, and acquire image data of one line in the main scanning direction. The image data acquired by the CMOS image sensors 25 is converted into digital signals by an analog-to-digital (A/D) conversion unit 217 (see FIG. 4) included in the reading mechanism 163. Further, the digital signals are subjected to various image processing operations by an image processing unit 31 (see FIG. 4), such as shading correction, gamma correction, chromatic aberration correction, modulation transfer function (MTF) correction, and scanner color correction. The image data generated by the image processing operations is stored in an image memory 32 (see FIG. 3).

The document S transmitted through the document reading slit 53 is discharged to a document discharge unit 66 by a pair of sheet discharge rollers 618 in accordance with the control of the controller 100.

In a case where the image reading unit 5 reads a document S set on the contact glass 161 by an operator, the reading mechanism 163 moves to a position P1 indicated by a broken line in FIG. 2. The reading mechanism 163 starts a document reading operation at the position P1, and reads an image on the side of the document S facing the contact glass 161, while moving in the direction indicated by the arrow in FIG. 2 (sub-scanning direction) from the position P1 to a position P2. The mechanism for irradiating the document with light and the process performed by the CMOS image sensors 25 are similar to those in the reading at the document reading position described above.

A standard reference plate 81 used for shading correction is mounted at a position adjacent to the document glass 530 in the sub-scanning direction (the direction perpendicular to the main scanning direction). The standard reference plate 81 is a white band-shaped member used to obtain a reference value for shading correction performed by the image processing unit 31. The white surface of the standard reference plate 81 has a uniform luminance distribution as a whole. The standard reference plate 81 extends in the main scanning direction of the reading mechanism 163 (in the direction perpendicular to the sheet in FIG. 2).

In order to set a white reference value for use in shading correction, the reading mechanism 163 moves to the position of the standard reference plate 81 in the sub-scanning direction. Further, the white surface of the standard reference plate 81 is irradiated with light from the LEDs 26, and the reflected light from the white surface is received at the CMOS image sensors 25 to obtain read data. The obtained read data is used as a white reference value. In order to set a black reference value for use in shading correction, the reading mechanism 163 also moves to the position of the standard reference plate 81, and the CMOS image sensors 25 receive incident light with the LEDs 26 turned off to obtain read data. The obtained read data is used as a black reference value.

The image processing unit 31 (see FIG. 3) performs shading correction on the document image data read by the reading mechanism 163. Further, the image processing unit 31 performs shading correction using reference image data such as the black reference value and the white reference value, which are set by the reading operation performed on the standard reference plate 81 by the reading mechanism 163. The image processing unit 31 performs shading correction to correct luminance. As such, the image data obtained by reading a document using the image reading unit 5 becomes image data having uniform brightness in the main scanning direction.

Figure 3:
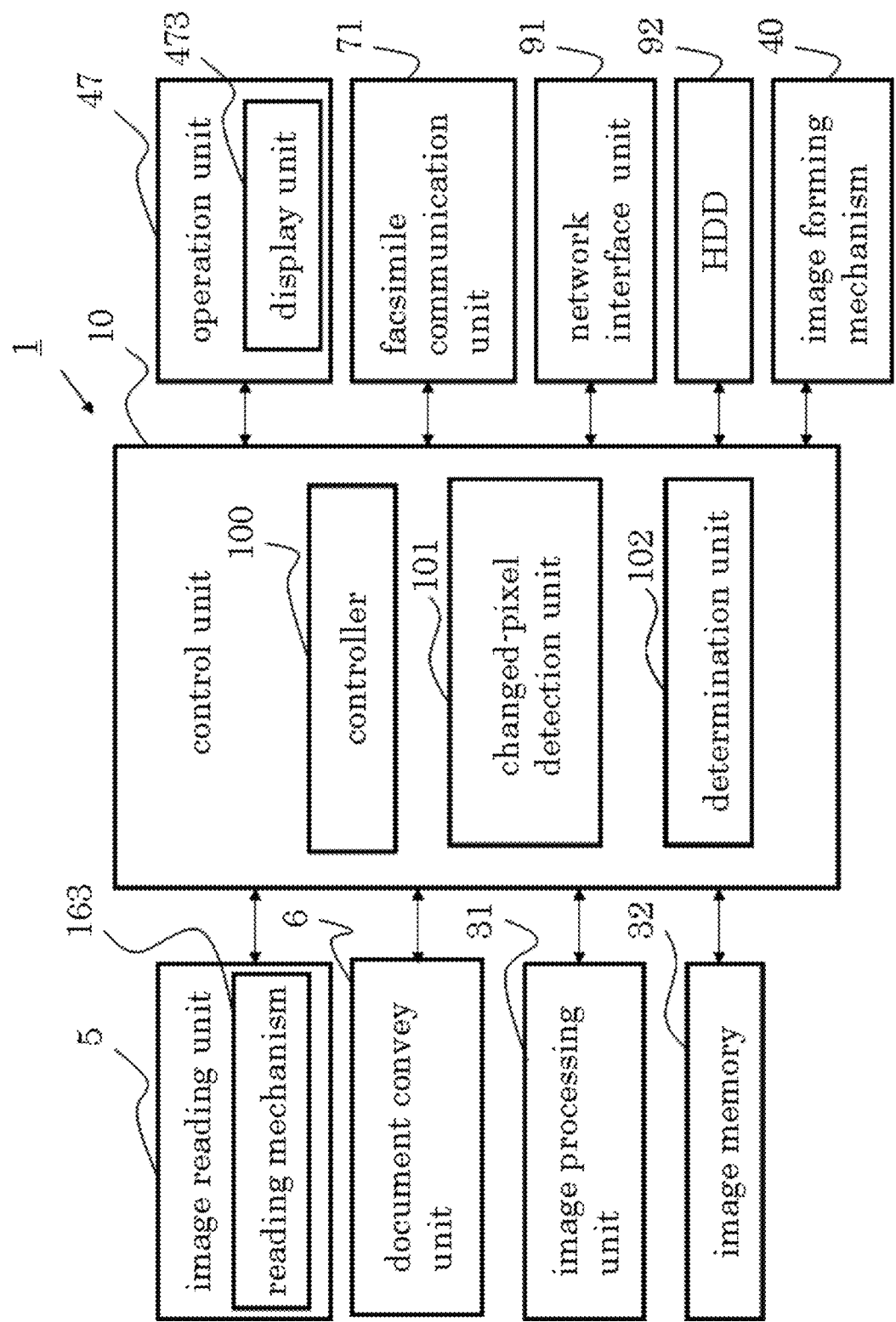
FIG. 3 is a schematic functional block diagram illustrating the main internal configuration of the image forming apparatus.

The configuration of the image forming apparatus 1 will now be described. FIG. 3 is a schematic functional block diagram illustrating the main internal configuration of the image forming apparatus 1.

The image forming apparatus 1 includes a control unit 10. The control unit 10 controls the overall operation of the image forming apparatus 1. Further, control unit 10 includes a central processing unit (CPU), a random access memory (RAM), a read-only memory (ROM), a dedicated hardware circuit, and so forth.

The control unit 10 is connected to the image reading unit 5, the document conveying unit 6, the image processing unit 31, the image memory 32, an image forming mechanism 40, an operation unit 47, a facsimile communication unit 71, a network interface unit 91, the HDD 92, and so forth. The control unit 10 controls the operation of each of the components connected to control unit 10, or transmits and receives signals or data to and from the components.

The control unit 10 controls the overall operation of the image forming apparatus 1 described above. The controller 100, included in the control unit 10, drives the individual components necessary to control the operations implementing functions. For example, controller 100 drives components to control a scanner function, a printer function, a copying function, and a facsimile function. In addition, controller 100 controls processes in accordance with a job execution instruction input by a user through the operation unit 47, a personal computer connected to a network, or the like.

As described above, the image reading unit 5 includes the reading mechanism 163, which may be a CIS-type image sensor. Using a CIS-type image sensor, the document is irradiated with light from the LEDs 26, and the reflected light therefrom is received by the CMOS image sensors 25 to generate image data from the document.

The image processing unit 31 may perform image processing on the image data generated by the image reading unit 5, if necessary. For example, the image processing unit 31 may perform predetermined image processing, such as the shading correction described above. In some instances, the shading correction may be performed on the image data generated by the image reading unit 5 in order to improve the quality of an image formed by the image forming unit 12.

The image memory 32 is a storage area for temporarily storing document image data. The temporarily storing document image data may be obtained by the document reading operation of the image reading unit 5 or temporarily saving data to be printed by the image forming mechanism 40.

The image forming mechanism 40 includes a sheet conveyance mechanism 411. The sheet conveyance mechanism 411 includes the image forming unit 12, the fixing unit 13, the conveyor roller pairs 192, and so forth. The image forming mechanism 40 forms an image of the image data or the like read by the image reading unit 5.

The operation unit 47 includes a touch panel unit and an operation key unit. Each unit may receive an instruction from a user for various operations and processes executable by the image forming apparatus 1. The touch panel unit includes a display unit 473 having a touch panel, such as a liquid crystal display (LCD).

The facsimile communication unit 71 includes an encoding/decoding unit, a modulation/demodulation unit, and a network control unit (NCU), all of which are not illustrated. Further, the facsimile communication unit 71 performs facsimile transmission over the public switched telephone network.

The network interface unit 91 includes a communication module such as a local area network (LAN) board, and transmits and receives various data to and from devices (such as personal computers) in a local area via a LAN or the like connected to the network interface unit 91.

The HDD 92 is a large-capacity storage device that stores document images and the like, possibly read by the image reading unit 5.

The control unit 10 further includes a changed-pixel detection unit 101 and a determination unit 102. The control unit 10 may function as the changed-pixel detection unit 101 and the determination unit 102, in accordance with an operation control program stored in the ROM included therein or the like. Alternatively, the changed-pixel detection unit 101 and the determination unit 102 may be implemented by hardware circuits.

The changed-pixel detection unit 101 detects a changed pixel whose pixel value differs from that of an adjacent pixel in the main scanning direction. In some instances, the changed-pixel detection unit 101 detects that the changed pixel value differs by more than a predetermined value. Further, in some instances, the changed-pixel detection unit 101 detects the position of the changed pixel in the main scanning direction from the document image data read by the image reading unit 5. The reading mechanism 163 reads an object to be read on a line-by-line basis, each line extending in the main scanning direction, to acquire read image data. The changed-pixel detection unit 101 calculates the difference in pixel value (lightness) between adjacent pixels (for example, the first derivative between pixel values of adjacent pixels in the main scanning direction) among pixels of each line arranged in the main scanning direction, which are read by the reading mechanism 163. Further, the changed-pixel detection unit 101 determines whether or not the calculated difference is greater than a predetermined value. The predetermined value is a value indicating the amount of change between a pixel value corresponding to white and a pixel value corresponding to black. The pixel values corresponding to white and black may be variable, as appropriate. Here, a pixel value corresponding to white may include not only a pixel value corresponding to pure white but also a pixel value corresponding to color which is darker than pure white. Similarly, a pixel value corresponding to black includes not only a pixel value corresponding to pure black but also a pixel value corresponding to color which is lighter than pure black. For example, when a pixel value corresponding to pure white is 255 and a pixel value corresponding to pure black is 0, range of pixel value corresponding to white may be 200 to 255 and range of pixel value corresponding to black may be 0 to 55. Lower limit of pixel value corresponding to white and upper limit of pixel value corresponding to black are valuable respectively, as appropriate.

The changed-pixel detection unit 101 uses, as a start pixel of a changed pixel, a pixel whose pixel value differs from the immediately preceding pixel by more than the predetermined value. Further, the changed-pixel detection unit 101 may use this pixel among other pixels sequentially arranged in the main scanning direction. Further, the changed-pixel detection unit 101 may use, as an end pixel, a pixel whose pixel value is greater than or equal to the pixel value of the start pixel. Further, an end pixel may be a pixel with a pixel value that is greater than or equal to the average of the pixel values of the start pixel and a pixel immediately preceding the start pixel. Further, the changed-pixel detection unit 101 detects, as a changed pixel, a pixel between the start pixel and the end pixel (including the start pixel). However, the changed-pixel detection unit 101 does not detect a pixel the end pixel as a changed pixel. The changed-pixel detection unit 101 detects one pixel or a plurality of pixels as a changed pixel or pixels. The changed-pixel detection unit 101 also detects the position of each changed pixel in the main scanning direction.

The changed-pixel detection unit 101 detects a changed pixel for image data obtained by reading the white guide member 80 using the image reading unit 5. Further, the changed-pixel detection unit 101 detects a changed pixel for image data obtained after reading the white guide member 80. Yet further, the changed-pixel detection unit 101 detects a changed pixel for image data obtained by reading a document conveyed by the document conveying unit 6 at the document reading position using the image reading unit 5. The determination unit 102 determines whether or not the detected positions of the changed pixel for the image data obtained by reading the white guide member 80 and the image data obtained by reading the conveyed document are the same in the main scanning direction. If it is determined that the detected positions of the changed pixel are the same in the main scanning direction, the determination unit 102 may determine that the changed pixel corresponds to a foreign image that is not a document image. As such, the determination unit 102 determines whether or not a changed pixel corresponds to a foreign image on the basis of whether or not positions of the changed pixel are consecutive in the sub-scanning direction.

In some embodiments, positions of the changed pixel are detected for the image data obtained by reading the white guide member 80 using the reading mechanism 163 of the image reading unit 5. In some instances, positions of the changed pixel are detected after reading the white guide member 80. Further, after reading the white guide member, positions of the changed pixel are detected for the image data obtained by reading a document conveyed by the document conveying unit 6 at the document reading position using the reading mechanism 163, are consecutive in the sub-scanning direction.

In some embodiments, the changed-pixel detection unit 101 detects a changed pixel in the last line of the image data obtained by reading the white guide member 80 using the reading mechanism 163. In some instances, the changed-pixel detection unit 101 detects a changed pixel in the first line of the image data obtained by reading the document conveyed by the document conveying unit 6 at the document reading position using the reading mechanism 163.

In some embodiments, the determination unit 102 determines that the detected changed pixels do not correspond to a foreign image unless these changed pixels are located at the same position in the main scanning direction. Further, in some instances, the determination unit 102 determines that the detected changed pixels do not correspond to a foreign image unless the positions of the changed pixels are consecutive in the sub-scanning direction.

Figure 4:
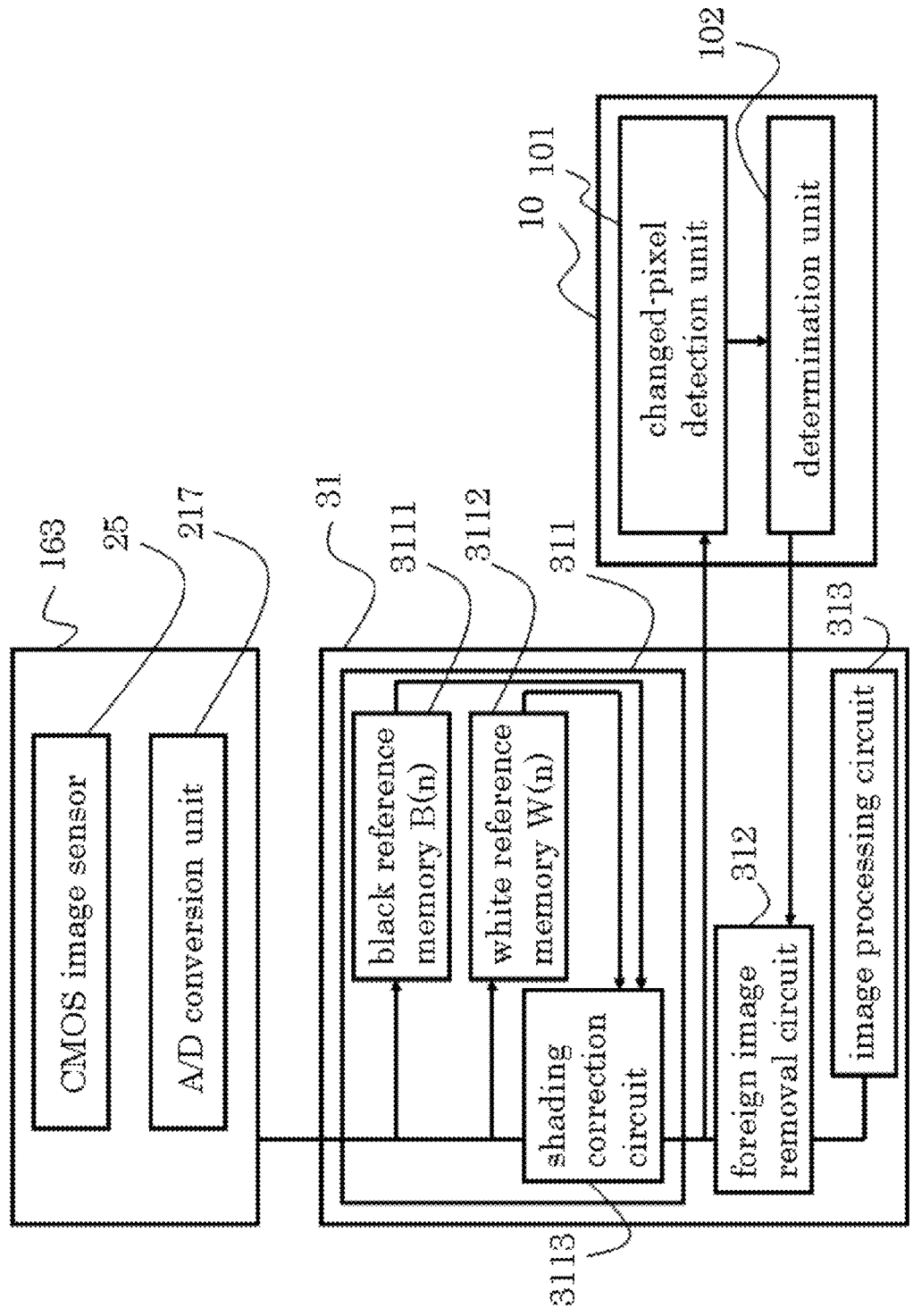
FIG. 4 is a block diagram illustrating the configuration of an image processing unit, a changed-pixel detection unit, and a determination unit.

Next, shading correction, the detection of a changed pixel, and the determination of the presence of a foreign image, which are performed in the image forming apparatus 1, will be described in more detail. FIG. 4 is a block diagram possibly illustrating the configuration of the image processing unit 31, the changed-pixel detection unit 101, and the determination unit 102.

The A/D conversion unit 217 converts the read image data formed with analog electrical signals transmitted from the CMOS image sensors 25 into digital read image data. The A/D conversion unit 217 outputs the converted digital read image data to the image processing unit 31. The A/D conversion unit 217 may be separate from the reading mechanism 163.

The image processing unit 31 includes a shading correction unit 311, a foreign image removal circuit 312, and an image processing circuit 313.

The shading correction unit 311 includes a black reference memory 3111, a white reference memory 3112, and a shading correction circuit 3113.

The black reference memory 3111 stores the black reference value, B(n), for use in shading correction, which is acquired by the reading mechanism 163.

The white reference memory 3112 stores the white reference value, W(n), for use in shading correction, which is acquired by the reading mechanism 163.

The shading correction circuit 3113 performs shading correction on the document image data read by the reading mechanism 163. As such, the converted digital read image data is provided by the A/D conversion unit 217. In particular, the black reference value is used to convert the digital read data. The black reference value is acquired by the reading operation performed on the standard reference plate 81 and is stored in the black reference memory 3111. Further, the white reference value is used to convert the digital read data. The white reference value is acquired by the reading operation performed on the standard reference plate 81 and stored in the white reference memory 3112. In the case of, for example, 256 gray levels, the shading correction circuit 3113 performs image processing using Expression (1), below, to correct the image data.

Input image data value ($I\_out$)=256×(input actual data ($I\_in$)−black reference value $B(n)$)÷(white reference value $W(n)$−black reference value $B(n)$),     (1).

The input image data value ($I\_out$) is data of a document image after shading correction, and the input actual data ($I\_in$) is data of a document image read by the reading mechanism 163.

The foreign image removal circuit 312 corrects an image determined to be a foreign image by the determination unit 102. In some instances, the image is corrected by one or more pixels from the start pixel of a changed pixel to the immediately preceding pixel of the end pixel in the main scanning direction. Further, in some instances, the image is corrected by performing linear interpolation using the pixel value of the pixel immediately preceding the start pixel of the changed pixel in the main scanning direction. Further, in some instances, the image is corrected using the pixel value of the pixel (terminal pixel) immediately subsequent to the last pixel of the changed pixel. Accordingly, the foreign image removal circuit 312 removes the foreign image.

The changed-pixel detection unit 101 acquires data of an image obtained as a result of shading correction. In some instances, the changed-pixel detection unit 101 acquires data by the shading correction circuit 3113 on a line-by-line basis. Further, in some instances, the changed-pixel detection unit 101 detects a changed pixel in the way described above and the position of the changed pixel in the main scanning direction. The changed-pixel detection unit 101 outputs the position of the changed pixel in the main scanning direction to the determination unit 102.

The determination unit 102 determines whether or not the changed pixel corresponds to a foreign image, based on the positions of the changed pixel in the main scanning direction for the individual lines, which are output from the changed-pixel detection unit 101. The determination unit 102 outputs an instruction to the foreign image removal circuit 312 to execute a foreign image removal process for a changed pixel determined to correspond to a foreign image.

The foreign image removal circuit 312 performs a foreign image removal process on the image data obtained by the shading correction circuit 3113. The foreign image removal process is performed as a result of shading correction in accordance with the instruction for executing a foreign image removal process.

The image processing circuit 313 performs image processing operations, such as gamma correction, chromatic aberration correction, MTF correction, and scanner color correction, on the data of the document image obtained as a result of shading correction described above. The image processing circuit 313 outputs the data of an image obtained as a result of the image processing operations to the image forming unit 12.

Figure 5:
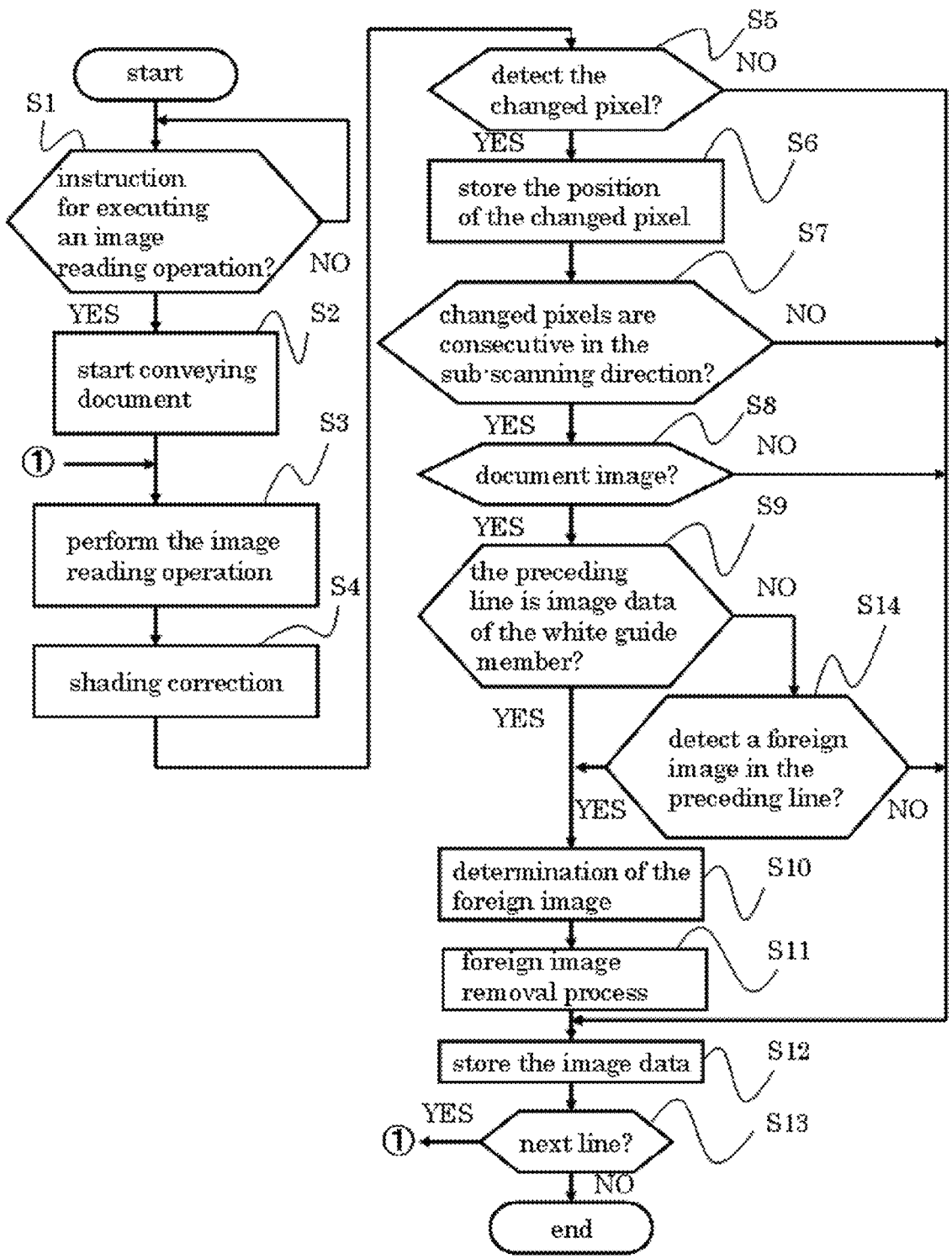
FIG. 5 is a flowchart illustrating a foreign image determination process and a foreign image removal process of the image forming apparatus according to a first embodiment.
Figure 6:
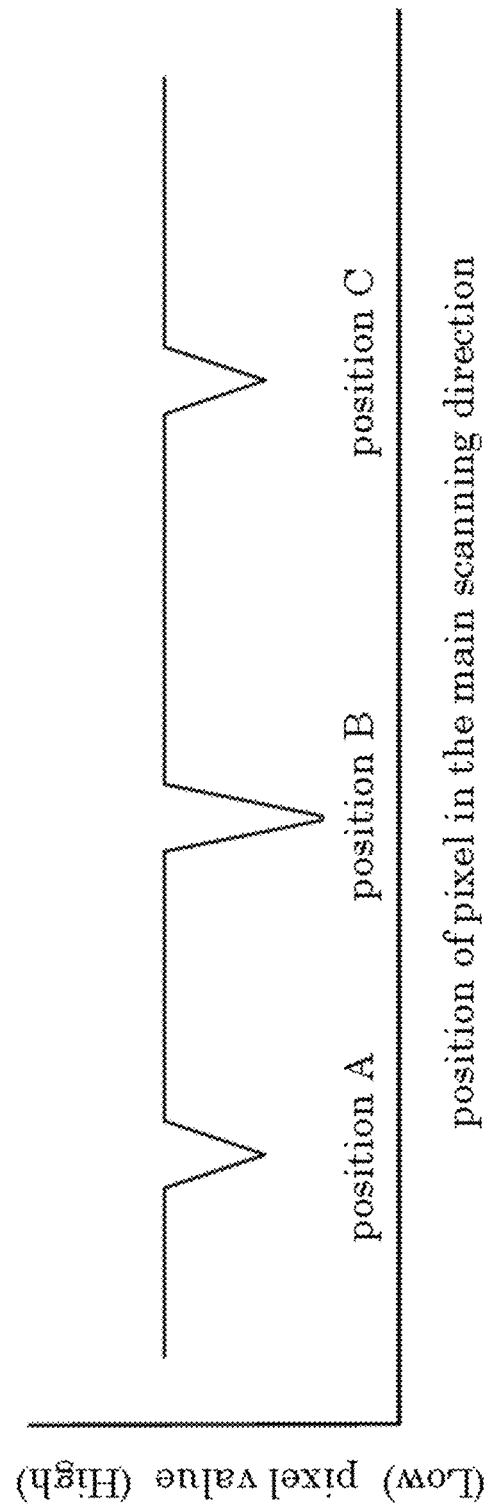
FIG. 6 is a diagram illustrating an example of pixel values of pixels read by the image reading unit.
Figure 7:
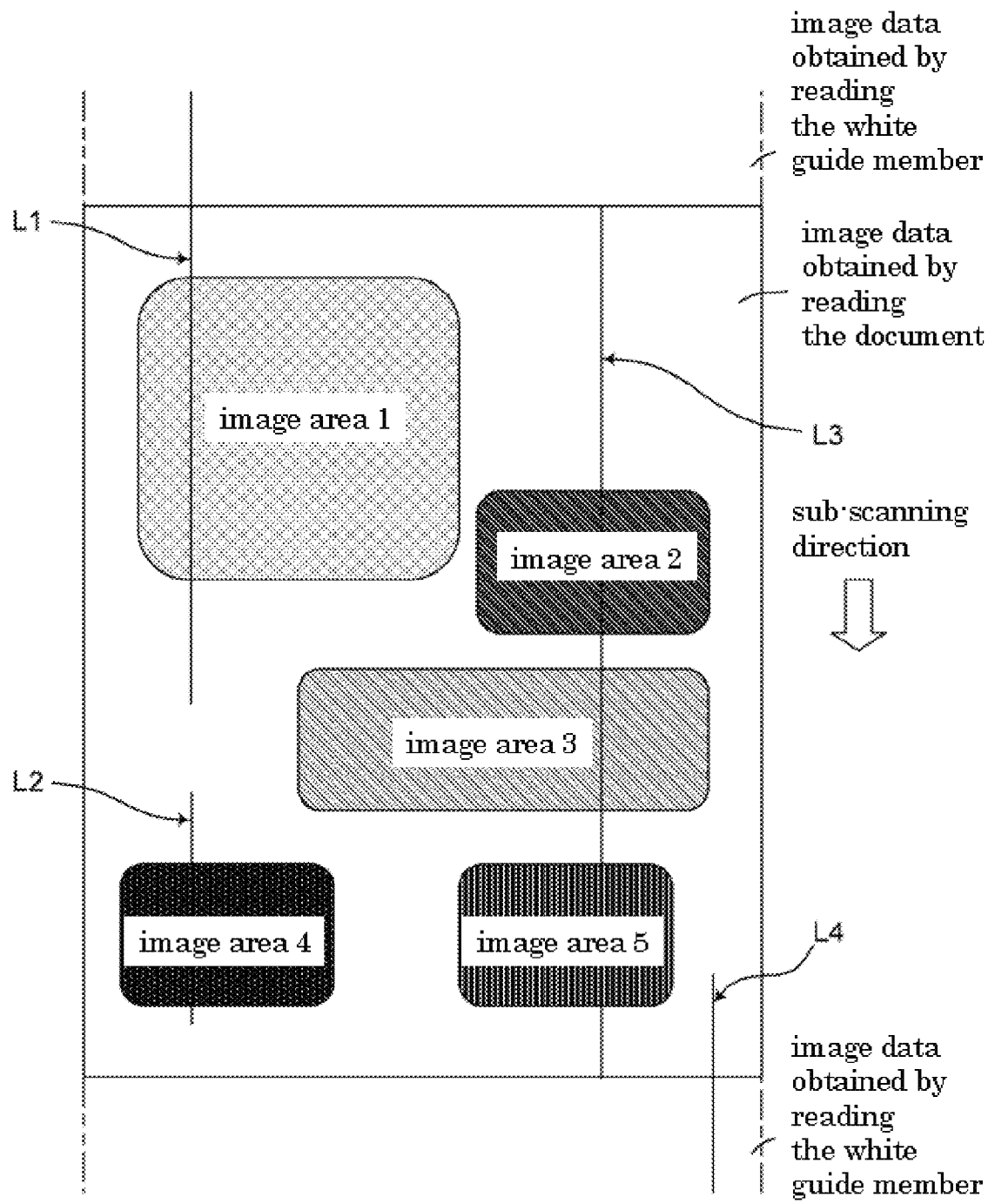
FIG. 7 is a conceptual diagram of a images read by the image reading unit.

Next, a foreign image determination process and a foreign image removal process of the image forming apparatus 1 according to a first embodiment will be described. FIG. 5 is a flowchart illustrating a foreign image determination process and a foreign image removal process of the image forming apparatus 1 according to the first embodiment. FIG. 6 is a diagram illustrating an example of pixel values of pixels read by the image reading unit 5. FIG. 7 is a conceptual diagram of images read by the image reading unit 5.

An operator sets a document to be read on the document set tray 61 of the document conveying unit 6 and operates the operation unit 47. The operator inputs an instruction to execute an image reading operation by, for example, inputting an instruction to execute a copying operation or a scanning operation. Upon receiving the instruction for executing an image reading operation (YES in S1), the controller 100 causes the document conveying unit 6 to start conveying the document set on the document set tray 61 toward the document reading position (S2).

The controller 100 further causes the image reading unit 5 to perform an image reading operation (S3). In this case, the controller 100 causes the image reading unit 5 to start the image reading operation at a time before the leading end of the document is conveyed to the document reading position by the document conveying unit 6. The controller 100 causes the image reading unit 5 to read the surface of the white guide member 80 through the document glass 530. After reading the white guide member 80, the controller 100 causes the image reading unit 5 to read the surface of the conveyed document, starting from the leading end of the document. The reading mechanism 163 of the image reading unit 5 performs the reading operation described above to acquire read data on a line-by-line basis, with each line extending in the main scanning direction.

Note that either of the document conveying operation (S2) and the image reading operation (S3), described above, may be started first. The controller 100 may be required to start the image reading operation at a time before the time when the leading end of the document reaches the document reading position.

The shading correction unit 311 performs shading correction each time the reading mechanism 163 acquires read data of one line (S4).

Each time shading correction for read data of one line is completed, the changed-pixel detection unit 101 detects a changed pixel of the line and the position of the changed pixel in the main scanning direction (S5).

The changed-pixel detection unit 101 detects a changed pixel whose pixel value differs from that of an adjacent pixel in the main scanning direction by more than a predetermined value. Further, the changed-pixel detection unit 101 detects the position of the changed pixel in the main scanning direction from the document image data read by the image reading unit 5. For example, when pixels arranged in the main scanning direction are obtained as read data of one line and have pixel values illustrated in FIG. 6, the changed-pixel detection unit 101 detects pixels at positions A, B, and C as changed pixels.

If the changed-pixel detection unit 101 detects no changed pixels for read data of one line (NO in S5), the controller 100 causes the image memory 32 to store the read data of the line in which no changed pixels are detected (S12). In some instances, there may be a subsequent line to be read. In particular, if the document conveyed by the document conveying unit 6 is still passing through the document reading position and is still present in the area for the object to be read by the reading mechanism 163 (YES in S13), the process returns to S3. As such, the image reading unit 5 continues to read the subsequent line.

The determination as to whether or not the document conveyed by the document conveying unit 6 is still passing through the document reading position (whether or not the document is present in the area for the object to be read by the reading mechanism 163) is performed by the controller 100. This determination is performed on the basis of a document detection signal or document non-detection signal output from a document detector, such as an optical sensor. The document detector may be disposed at the document reading position in a document conveying path. Further, this determination may be performed on the basis of whether or not a certain amount of time has elapsed since document detection signals output from registration sensors. In particular, the registration sensors may be located at the positions of the registration rollers 615 and configured to detect the presence of a document at the positions where the registration rollers 615 are disposed were received. The amount of time elapsed may exceed a predetermined amount of time required for the document to reach the document reading position from the portion where the registration sensors 615 are arranged.

If the changed-pixel detection unit 101 detects a changed pixel for read data of one line and the position of the changed pixel in the main scanning direction (YES in S5), the changed-pixel detection unit 101 stores the detected position of the changed pixel (S6). The changed-pixel detection unit 101 outputs the detected position of the changed pixel in the main scanning direction for the read data of the line in which the changed pixel has been detected to the determination unit 102.

The determination unit 102 determines whether or not the position of the changed pixel in the main scanning direction, which is acquired from the changed-pixel detection unit 101, is the same as the position of the changed pixel in the main scanning direction in the line preceding the line in which the position of the changed pixel in the main scanning direction has been output from the changed-pixel detection unit 101 by one line (hereinafter referred to as "preceding line"). Further, this determination is stored in the changed-pixel detection unit 101 (S7). As such, the determination unit 102 determines whether or not changed pixels are consecutive in the sub-scanning direction. If a changed pixel is formed of a plurality of pixels, pixels from the start pixel of the changed pixel to the last pixel of the plurality of pixels are combined into a changed pixel group. The same applies to the following. In S7, if the line read in S3 is the first line and there are no preceding lines, NO is determined in S7. NO is also determined in S7 if the changed pixel or the position of the changed pixel in the main scanning direction is not detected in the preceding lines. If NO is determined in S7, the process proceeds to S12.

If the determination unit 102 determines that the position of the changed pixel in the main scanning direction which is detected in the line read in S3 is the same as the position of the changed pixel in the main scanning direction which is detected in the preceding line (YES in S7), the determination unit 102 determines whether the read data of the line read in S3 is image data obtained by reading the surface of the document or image data obtained by reading the surface of the white guide member 80 (S8). The determination unit 102 determines whether the read data of the line read in S3 is image data obtained by reading the surface of the document or image data obtained by reading the surface of the white guide member 80. For example, such determinations are made based on a document detection signal or document non-detection signal supplied from the document detector described above. In some instances, such determinations are made based on whether or not a certain amount of time has elapsed since document detection signals were received from the registration sensors. The result of the determination of the determination unit 102 is stored in the determination unit 102.

If the determination unit 102 determines that the read data of the line read in S3 is image data obtained by reading the surface of the document (YES in S8), the determination unit 102 further determines whether or not the read image data of the preceding line is image data obtained by reading the surface of the white guide member 80. In some instances, such determinations are made on the basis of the determination result stored therein described above (S9).

If the determination unit 102 determines that the read image data of the preceding line is image data obtained by reading the surface of the white guide member 80 (YES in S9), the determination unit 102 determines that image data formed by the changed pixel in the line read in S3 forms a foreign image (S10). The determination unit 102 stores the result of the determination for the line read in S3. The determination unit 102 outputs an instruction to the foreign image removal circuit 312 to execute a foreign image removal process.

The foreign image removal circuit 312 of the image processing unit 31 performs the process of removing the changed pixel determined to correspond to a foreign image for the line read in S3 (S11). The controller 100 causes the image memory 32 to store the image data of the line read in S3 from which the foreign image removal circuit 312 has removed the foreign image (S12). After that, the process proceeds to S13.

If the determination unit 102 determines in S9 that the read image data of the preceding line is not image data obtained by reading the surface of the white guide member 80, that is, the read image data of the preceding line is document image data obtained by reading the surface of the document (NO in S9) and if the determination unit 102 determines that the changed pixel detected in the preceding line at the same position in the main scanning direction corresponds to a foreign image (YES in S14), the determination unit 102 determines that the changed pixel in the line read in S3 corresponds to a foreign image (S10). Then, the process proceeds to S11, and the processing of S11 and the subsequent processing are performed.

If the determination unit 102 determines that the changed pixel detected in the preceding line at the same position in the main scanning direction does not correspond to a foreign image (NO in S14), the process proceeds to S12, and the processing of S12 and the subsequent processing are performed.

If the determination unit 102 determines in S8 that the read data of the current line (the line read in S3) is not document image data but image data obtained by reading the surface of the white guide member 80 (NO in S8), the process proceeds to S12.

If the controller 100 determines in S13 that the image on the document has been read up to the last line (NO in S13), the process ends. After that, the image data of the individual lines included in the document image data is read in the manner described above and stored data in the image memory 32 is used by the image forming unit 12 to form an image, saved in the HDD 92, or output to and saved in another personal computer connected to a network in accordance with the content of the instruction input by the operator in S1.

In the first embodiment, therefore, the determination unit 102 determines that a changed pixel corresponds to a foreign image based on positions of the changed pixel. In some instances, positions of the changed pixel are detected by the changed-pixel detection unit 101 for image data obtained by reading the white guide member 80 through the document glass 530 using the image reading unit 5. In some instances, positions of the changed pixel are detected for image data obtained by, after reading the white guide member 80, reading a document conveyed by the document conveying unit 6, using the image reading unit 5. In some instances, positions of the changed pixel are consecutive in lines arranged in the sub-scanning direction at the same position in the main scanning direction. Thus, only image data obtained by reading, using the image reading unit 5, a document through the document glass 530 on which dust is deposited can be detected as a foreign image. The series of processes described above is merely an example for determining the presence of a foreign image, and may vary, if necessary.

For example, an image obtained by reading dust deposited on the document glass 530 may appear as a vertical stripe extending in the sub-scanning direction on a document image. There is a need to distinguish the image of such a vertical stripe caused by dust from the image of a vertical line on a document, such as a ruled line. In the first embodiment described above, the image of such a vertical stripe caused by dust may be accurately distinguished from the image of a vertical line such as a ruled line.

For example, an image including image data of individual lines in the sub-scanning direction which is read by the image reading unit 5 is illustrated as an example in FIG. 7. In the illustrated image, each of pixels in lines, which are included in a vertical stripe L1, has a pixel value which differs from the pixel value of an adjacent pixel in the main scanning direction by a large amount. Further, the image is detected with a changed pixel by the changed-pixel detection unit 101. Furthermore, the vertical stripe L1 is formed by pixels located in consecutive lines. Yet further, the vertical stripe L1 is formed at the same positions in the main scanning direction and from lines indicating image data. The image data may be obtained by reading the surface of the white guide member 80 to lines indicating image data obtained by reading the surface of a document. Thus, the determination unit 102 determines that the image of the vertical stripe L1 corresponds to a foreign image.

In the first embodiment, in S7, the determination unit 102 determines whether or not a changed pixel corresponds to a foreign image. In some instances, determination unit 102 makes this determination when the image reading unit 5 is reading an image of a document on a line-by-line basis. Further, in some instances, determination unit 102 makes this determination when positions of the changed pixel obtained are consecutive in lines arranged in the sub-scanning direction and are at the same position in the main scanning direction. Yet further, in some instances, this determination is made successively from reading image data of the white guide member 80 (YES in S7). If positions of the changed pixel are not consecutive, NO is determined in S7, and even if the changed-pixel detection unit 101 detects the changed pixel, the changed pixel is not determined to correspond to a foreign image. Hence, if the changed pixel is detected at the same position in the main scanning direction in a line after the line in which the changed pixel is not detected among lines arranged in the sub-scanning direction, the determination unit 102 determines that the changed pixel does not correspond to a foreign image.

For example, a vertical stripe L2 appears at the same position in the main scanning direction as that of the changed pixel included in the vertical stripe L1. Changed pixels of lines included in the vertical stripe L2 indicate image data obtained by reading the surface of a document but do not include consecutive pixels of lines from lines indicating image data obtained by reading the surface of the white guide member 80 to the lines indicating image data obtained by reading the surface of the document. In the first embodiment, therefore, the determination unit 102 determines that the changed pixels of the lines included in the vertical stripe L2 do not correspond to a foreign image. The determination of the presence of a foreign image in the manner described above allows the image of a vertical stripe caused by dust to be accurately distinguished from the image of a vertical line such as a ruled line, which is an image on a document. Additionally, the image of a line extending on the document in the sub-scanning direction, such as a ruled line, does not appear in the image data obtained by reading the white guide member 80 through the document glass 530 by using the image reading unit 5 but appears only in the image data obtained by reading the document. In the first embodiment, such image data obtained by reading objects on a document, such as characters, symbols, and ruled lines, is not determined to be a foreign image. Therefore, a foreign image caused by dust deposited on the document glass 530 may be accurately detected.

In the related art, a changed pixel is detected as a foreign image only when the changed pixel is detected in all the lines from the leading end to trailing end of a document in the sub-scanning direction, such as a vertical stripe L3 illustrated in FIG. 7. For example, when dust deposited on the document glass 530 is not read by the image reading unit 5 because the dust has moved to another place while the image reading unit 5 is reading the surface of the document, the image of the vertical stripe L1 may be obtained. In the related art, however, since image data in which a changed pixel is not consecutively detected in all the lines from the leading end to trailing end of the document, such as the vertical stripe L1, such image data may possibly be image data obtained by reading an image on a document. Thus, the image of the vertical stripe L1 is not detected as a foreign image. In the first embodiment, in contrast, it may be accurately determined whether even image data that ends at any position on a document in the sub-scanning direction, such as the vertical stripe L1, is image data obtained by reading an image on the document or a foreign image.

Specifically, in the first embodiment, for example, the image reading unit 5 reads a document conveyed in the manner described above on a line-by-line basis after reading the white guide member 80. Further, even if the changed-pixel detection unit 101 detects a changed pixel at the same position in the main scanning direction successively from the read image data of the white guide member 80 and then does not detect the changed pixel in image data of the subsequent line in the sub-scanning direction, the determination unit 102 determines that the changed pixel corresponds to a foreign image. This determination is made because the condition that positions of the changed pixel for lines from lines indicating image data obtained by reading the surface of the white guide member 80 to lines indicating image data obtained by reading the surface of the document are consecutive in the sub-scanning direction is satisfied. Therefore, if the movement of dust over a document glass during the reading of a document makes it difficult to read a foreign image at the same position as the position before the dust has moved, a foreign image caused by the dust may be accurately detected. This ensures that the foreign image removal process is performed.

According to the first embodiment, furthermore, since it is not necessary to simultaneously read a plurality of lines to detect a foreign image, a line sensor such as a color CCD sensor or a line sensor configured to simultaneously read a plurality of lines is not required. A sensor having a simple configuration, such as a monochrome line sensor or a CIS sensor, may accurately detect a foreign image.

According to the first embodiment, therefore, even a sensor having a simple configuration may detect a foreign image caused by floating dust which moves over a document glass from one position to another, resulting in a reduction in manufacturing cost. In addition, a foreign image caused by floating dust may be more accurately detected than in the related art.

Figure 8:
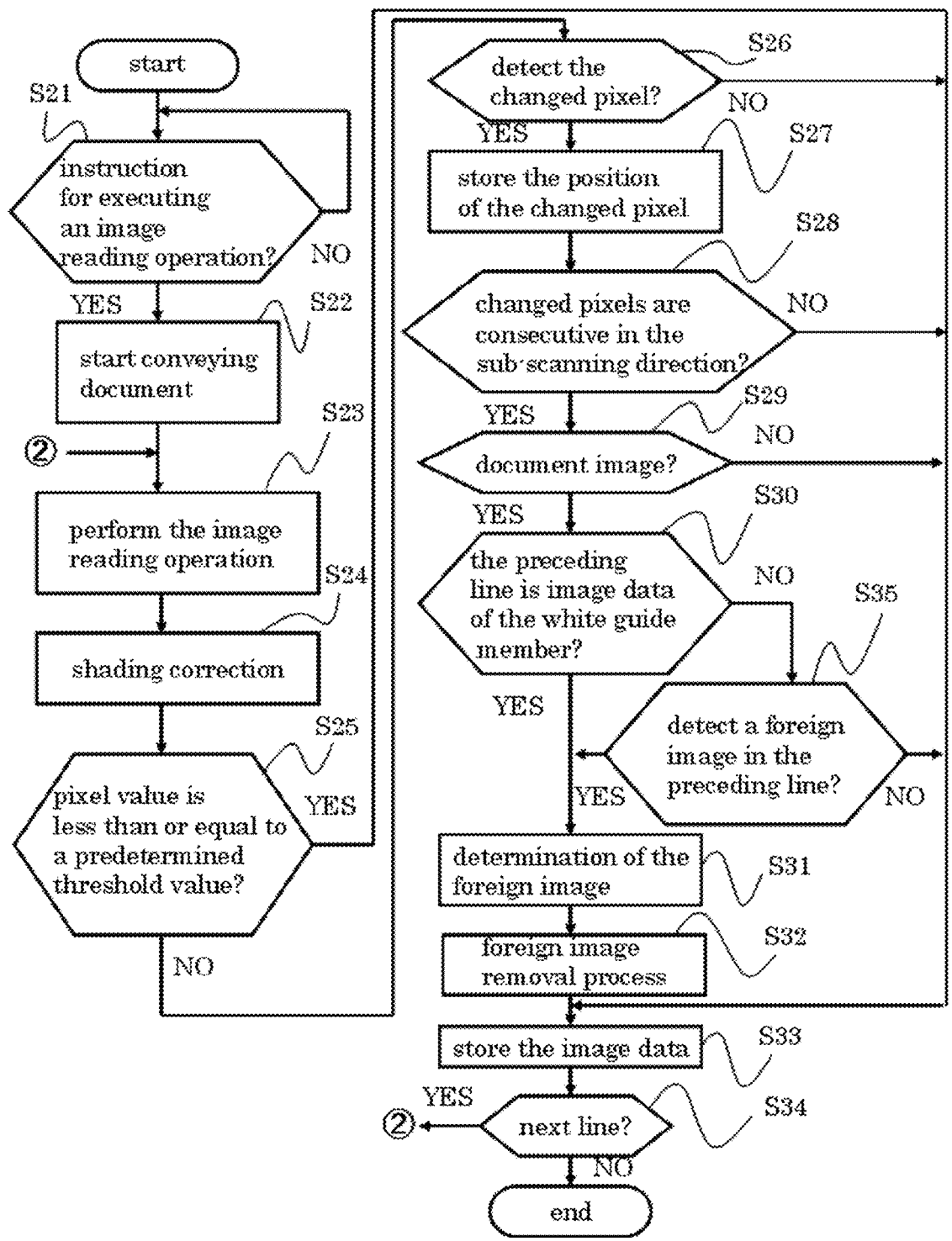
FIG. 8 is a flowchart illustrating a foreign image determination process and a foreign image removal process of the image forming apparatus according to a second embodiment.

Next, a foreign image determination process and a foreign image removal process of the image forming apparatus 1 according to a second embodiment will be described. FIG. 8 is a flowchart illustrating a foreign image determination process and a foreign image removal process of the image forming apparatus 1 according to the second embodiment. A description of processes similar to those in the first embodiment will be omitted.

In the second embodiment, after the completion of shading correction for image data of lines acquired by the reading mechanism 163 (S24), the changed-pixel detection unit 101 does not detect a changed pixel for a pixel adjacent to a pixel having a pixel value less than or equal to a predetermined threshold value (for example, 50 out of 256 gray levels) in the image data of the lines read by the image reading unit 5 (YES in S25). The process proceeds to S33. That is, if each of pixels arranged in the main scanning direction of image data of lines read by the image reading unit 5 has a pixel value less than or equal to a predetermined threshold value, the changed-pixel detection unit 101 determines whether or not a pixel adjacent to the pixel having such a pixel value is not a changed pixel.

For example, if image data of lines read by the image reading unit 5 includes pixels which constitute image data on a document, the pixel values of the pixels are generally smaller than the pixel value of a pixel obtained when the surface of the document, which is typically white, is read. Additionally, the pixel value of a pixel obtained when dust is read is also generally equal to a pixel value indicating a pixel value near black, and is therefore small. Thus, if document image data read by the image reading unit 5 includes, in an image area, image data caused by dust, even though a pixel having a pixel value which may cause a changed pixel exists, it is difficult for the changed-pixel detection unit 101 to accurately detect a changed pixel by determining whether or not the difference in pixel value between the changed pixel and an adjacent pixel is greater than a predetermined value because the difference is comparatively small. In the second embodiment, accordingly, the detection of a changed pixel is not performed in a situation that may result in an incorrect detection. As a result, the accuracy of the detection of a foreign image caused by dust on a document glass or image data obtained by reading an actual image on a document may be maintained high.

Figure 9:
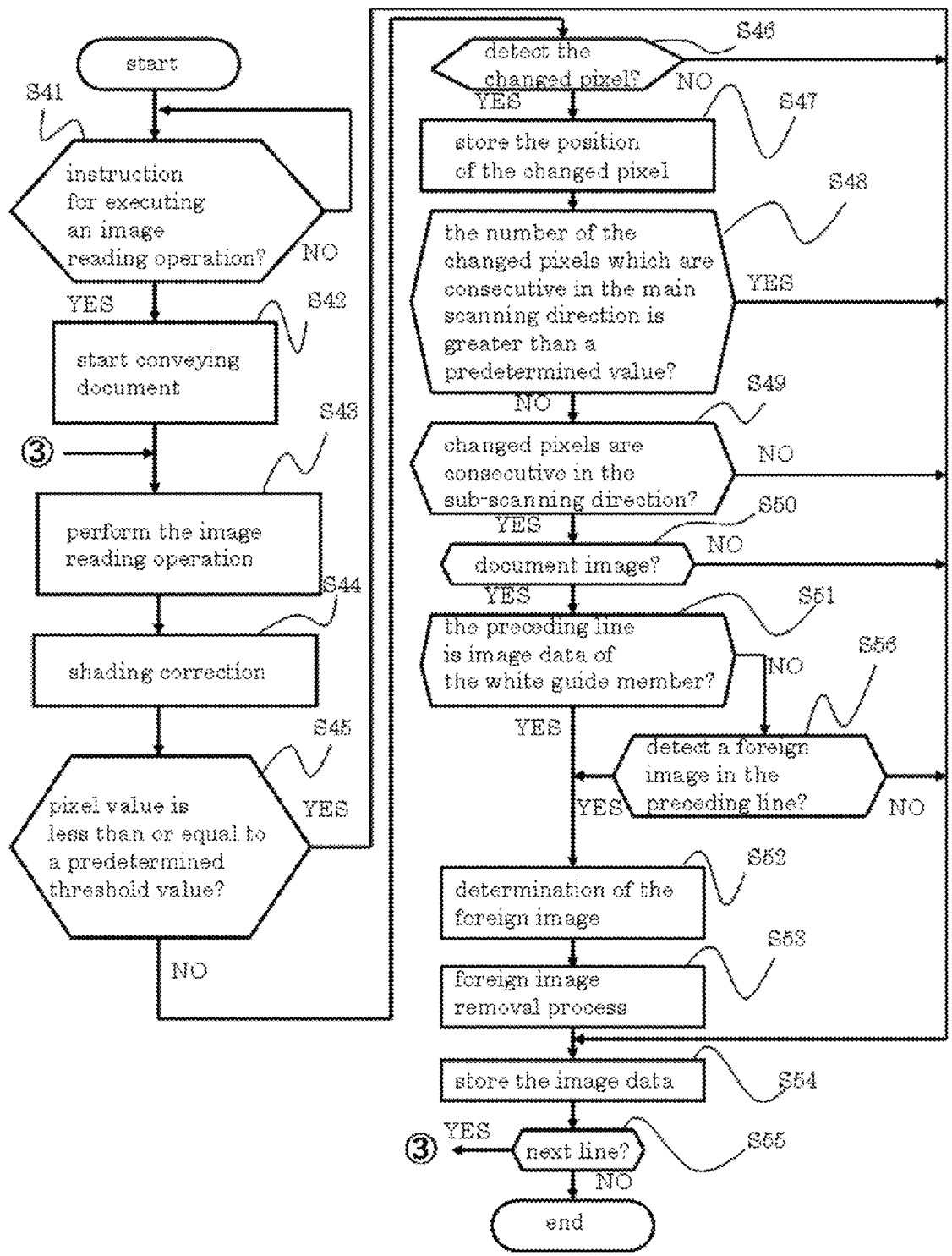
FIG. 9 is a flowchart illustrating a foreign image determination process and a foreign image removal process of the image forming apparatus according to a third embodiment.
Figure 10:
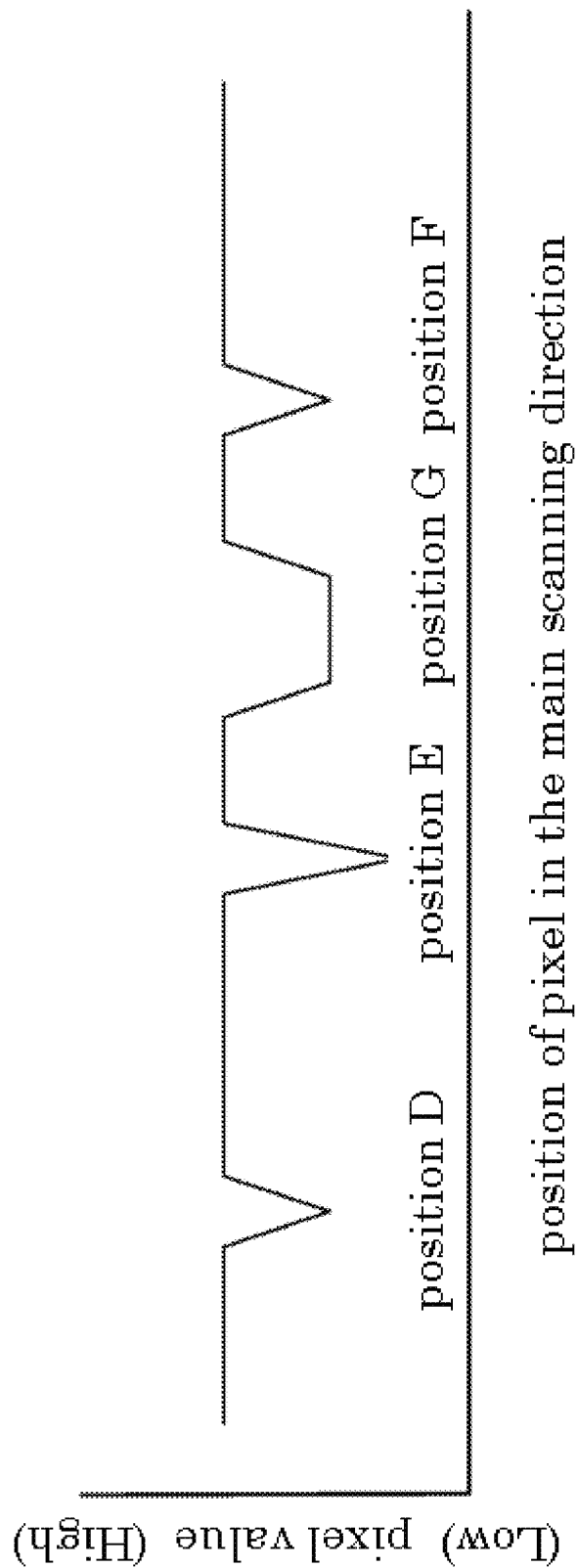
FIG. 10 is a diagram illustrating an example of pixel values of pixels read by the image reading unit.

Next, a foreign image determination process and a foreign image removal process of the image forming apparatus 1 according to a third embodiment will be described. FIG. 9 is a flowchart illustrating a foreign image determination process and a foreign image removal process of the image forming apparatus 1 according to the third embodiment. FIG. 10 is a diagram illustrating an example of pixel values of pixels read by an image reading unit. A description of processes similar to those in the first or second embodiment will be omitted.

In the third embodiment, when the changed-pixel detection unit 101 detects a changed pixel in S46 (YES in S46) and stores the position of the changed pixel in the main scanning direction (S47), the determination unit 102 determines whether or not the number of consecutive changed pixels is greater than a predetermined value. In some instances, a predetermined value may be a value regarding the number of pixels in the main scanning direction which are included in read image data obtained by reading dust deposited on the document glass 530. For example, the value may be 5% of the number of pixels per line in the main scanning direction. As such, the number of consecutive changed pixels exceeding the predetermined value may be detected in the main scanning direction (S48).

If the determination unit 102 determines that changed pixels, the number of which is not greater than the predetermined value, are not consecutive in the main scanning direction (NO in S48), the foreign image determination process of S49 and the subsequent processing are executed. If the determination unit 102 determines that changed pixels, the number of which is greater than the predetermined value, are consecutive in the main scanning direction (YES in S48), on the other hand, the process proceeds to S54 without the foreign image determination process of S49 and the subsequent processing being performed.

For example, dust deposited on the document glass 530 is generally read as an image much smaller than an image on a document. Presetting the size of an image of dust may allow an image larger than the image of the dust to be identified as an image on a document. By way of example, changed pixels including a comparatively small number of pixels in the main scanning direction, such as pixels identified by positions D, E, and F illustrated in FIG. 10, are determined by the determination unit 102 to be pixels corresponding to a foreign image. In contrast, changed pixels including a comparatively large number of pixels in the main scanning direction, such as pixels identified by a position G may represent an image obtained by reading an image on a document even if the difference between the pixel value of each of the pixels and the pixel value of an adjacent pixel is greater than the predetermined value described above. In the third embodiment, the determination unit 102 determines that changed pixels having a number of pixels corresponding to an image estimated to be larger than the image of dust deposited on the document glass 530 do not correspond to a foreign image.

In the third embodiment, therefore, the accuracy of the detection of a foreign image caused by dust on the document glass 530 or an image obtained by reading an actual image on a document may be maintained high.

As illustrated in FIG. 9, it is determined whether or not each of pixels arranged in the main scanning direction of image data of a line read by the image reading unit 5 has a pixel value less than or equal to the predetermined threshold value described above (S45). The third embodiment is not limited to this example, and the processing of S45 may be omitted.

In the first to third embodiments described above, the detection of a changed pixel and the determination of the presence of a foreign image are implemented each time the image reading unit 5 acquires read data of each line. If sensors in the reading mechanism 163 have, in the sub-scanning direction, a plurality of lines each extending in the main scanning direction, the detection of a changed pixel and the determination of the presence of a foreign image may be implemented each time read data is acquired for each plurality of lines. Alternatively, instead of each time read data is acquired for each line as described above, after read data of all the lines in which the surface of the white guide member 80 and the surface of a document have been read is accumulated in the image memory 32, read data of each line may be read from the image memory 32 and the detection of a changed pixel and the determination of the presence of a foreign image may be implemented for each line.

Figure 11:
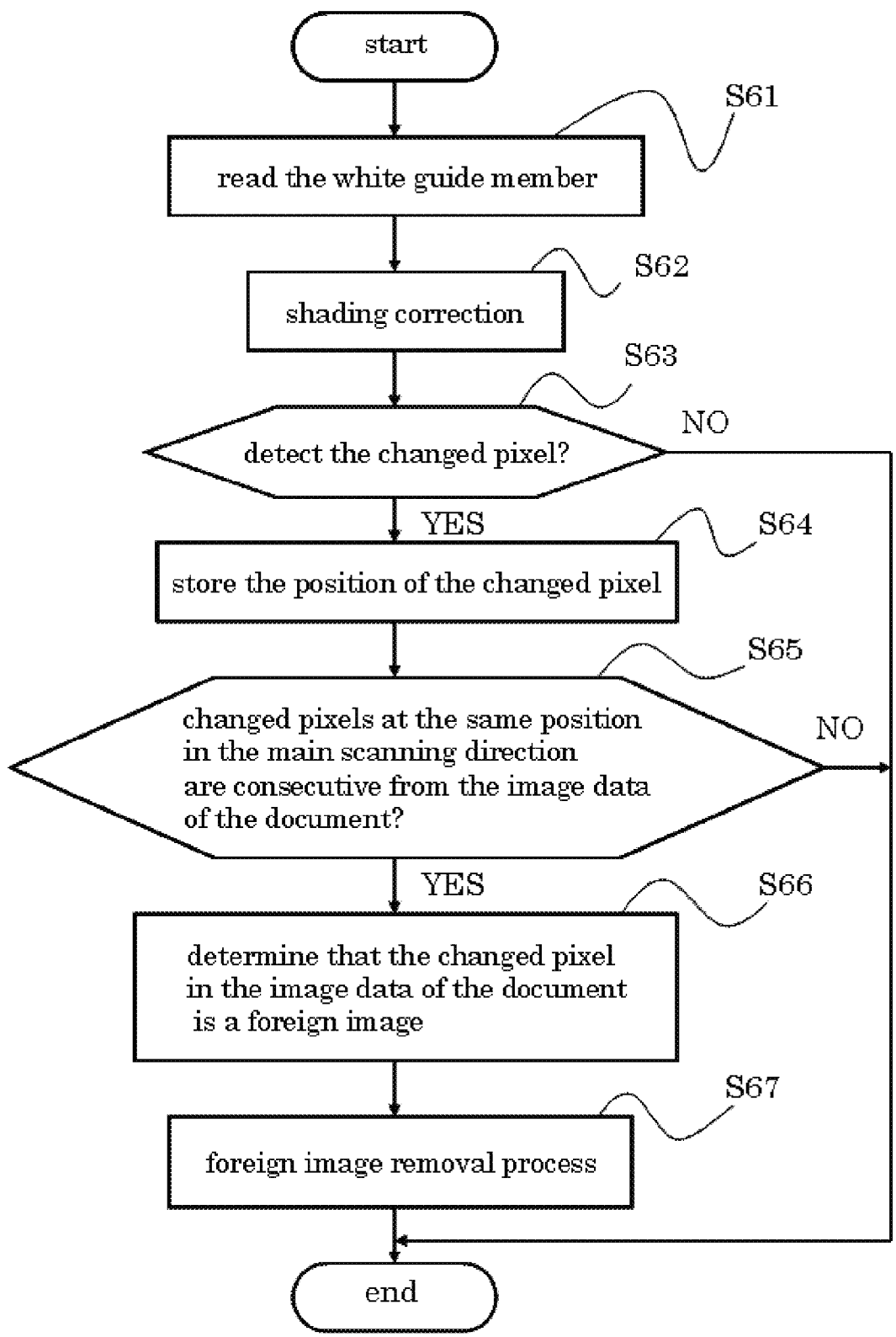
FIG. 11 is a flowchart illustrating a foreign image determination process and a foreign image removal process of the image forming apparatus according to a fourth embodiment.

Next, a foreign image determination process and a foreign image removal process of the image forming apparatus 1 according to a fourth embodiment will be described. FIG. 11 is a flowchart illustrating a foreign image determination process and a foreign image removal process of the image forming apparatus 1 according to another embodiment. A description of processes similar to those in the first to third embodiments will be omitted.

In the first to third embodiments described above, the foreign image determination process and the foreign image removal process are performed after the area up to the trailing end of a document has been read by the image reading unit 5.

In the fourth embodiment, the controller 100 causes the image reading unit 5 to continue the image reading operation even after the area up to the trailing end of a document has been read by the image reading unit 5, and causes the image reading unit 5 to read the white guide member 80, which appears in the reading area of the image reading unit 5 after the passage of the document, on a line-by-line basis to acquire read data (S61). The shading correction unit 311 performs shading correction each time the image reading unit 5 acquires read data of each line (S62).

Each time shading correction for read data of each line is completed, the changed-pixel detection unit 101 detects a changed pixel for the read data of the line and the position of the changed pixel in the main scanning direction (S63). If the changed-pixel detection unit 101 does not detect a changed pixel or a position of a changed pixel in the main scanning direction for the read data of the line (NO in S63), the process ends.

On the other hand, if the changed-pixel detection unit 101 detects a changed pixel and the position of the changed pixel in the main scanning direction for the read data of the line in S63 (YES in S63), the changed-pixel detection unit 101 stores the detected position of the changed pixel in the main scanning direction (S64).

Then, the determination unit 102 determines whether or not the changed pixel is located in the image data of the preceding line obtained by the image reading unit 5 (that is, image data of the line in which the trailing end of the surface of the document has been read) at the same position in the main scanning direction, that is, whether or not positions of the changed pixel for the line in which the document has been read and the line in which the white guide member 80 has been read are consecutive (S65).

If the determination unit 102 determines that the changed pixel is located at the same position in the main scanning direction as that of the changed pixel in the image data of the preceding line obtained by the image reading unit 5 (YES in S65), the determination unit 102 extracts a line consecutive to the line in which the trailing end of the surface of the document has been read. The line is extracted among lines arranged in the sub-scanning direction prior to the preceding line. Further, the determination unit 102 determines that the changed pixel in the extracted line corresponds to a foreign image (S66). The determination unit 102 outputs an instruction to the foreign image removal circuit 312 to execute a foreign image removal process.

The foreign image removal circuit 312 removes the changed pixel determined to correspond to a foreign image from the image data of the line specified by the instruction for executing a foreign image removal process. In some instances, the instruction is output from the determination unit 102. Further, in some instances, the changed pixel is removed from within the image data of the lines included in the document image stored in the image memory 32 (S67). Thus, the image data of the lines from which the foreign image has been removed is saved in the image memory 32, in place of the image data of the lines in which the foreign image is included. After that, the process ends.

In the fourth embodiment, a changed pixel is detected in image data of the line subsequent to the line in which the trailing end of the document has been read. In some instances, this is the line in which the white guide member 80 has been read by the image reading unit 5. Further, in some instances, the changed pixel is detected at the same position in the main scanning direction as the consecutive positions of the changed pixel in individual lines from the middle to trailing end of the document. For example, considering the vertical stripe L4 illustrated in FIG. 7, the determination unit 102 determines that the changed pixel in the image data of the lines from the middle to trailing end of the document corresponds to a foreign image. Thus, a foreign image caused by dust falling on the document glass 530 while the image reading unit 5 is reading a document may be accurately detected.

The disclosure is not limited to the foregoing embodiments, and a variety of modifications may be made. For example, in the foregoing embodiments, detection of a changed pixel and the determination of the presence of a foreign image are performed on read data of each line obtained as a result of shading correction by the shading correction unit 311. Instead of this, the detection of a changed pixel and the determination of the presence of a foreign image may be performed on read data of each line before shading correction is performed.

The configurations and processes described in the foregoing embodiments with reference to FIGS. 1 to 11 merely constitute embodiments of the disclosure, and the disclosure is not intended to be limited to the configurations and processes.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein, will be apparent to those skilled in the art from the foregoing descriptions. Such modifications and variations are intended to fall within the scope of the appended claims.

The invention claimed is:

1. An image reading device comprising:
an image reading unit that optically reads, on a line-by-line basis, a document at a predetermined document reading position through a document glass, wherein each line extends in a main scanning direction;
a white guide member disposed at the document reading position so as to face the document glass, wherein the white guide member is read by the image reading unit;
a document conveying unit that conveys the document toward the document reading position, wherein the document conveying unit directs the document to travel between the white guide member and the document glass;
a changed-pixel detection unit that, based on image data read by the image reading unit, is configured to detect: (a) a changed pixel with a pixel value that differs from a pixel value of an adjacent pixel in the main scanning direction by more than a predetermined value, and (b) a position of the changed pixel in the main scanning direction;
a reference member read by the image reading unit to obtain reference image data for shading correction;
an image processing unit that performs the shading correction on the image data obtained by reading the document using the image reading unit;
a determination unit that determines, after the shading correction, based on the position of the changed pixel in the main scanning direction, whether or not:
positions in the main scanning direction of the changed pixel of a first line of the image data obtained by reading the document conveyed by the document conveying unit are the same as positions in the main scanning direction of the changed pixel of a last line of the image data obtained by reading the white guide member immediately before or after reading the document, and/or
positions in the main scanning direction of the changed pixel of a last line of the image data obtained by reading the document conveyed by the document conveying unit are the same as positions in the main scanning direction of the changed pixel of a first line of the image data obtained by reading the white guide member immediately after reading the document,
wherein when the determination unit determines that the positions of the changed pixel are consecutive in the sub-scanning direction, the determination unit determines that the positions of the changed pixel for the image data obtained by reading the document correspond to a foreign image, and
wherein the positions of the changed pixel are determined from the image data obtained by reading the document and the image data obtained by reading the white guide member.

2. The image reading device according to claim 1, wherein the positions of the changed pixel are detected by the changed-pixel detection unit when the image reading unit is reading the conveyed document on the line-by-line basis,
wherein if the positions of the changed pixel are located at the same position in the main scanning direction and are consecutive in the sub-scanning direction, then the determination unit determines that the positions of the changed pixel for the image data obtained by reading the document correspond to the foreign image, wherein the determination is made when the changed-pixel detection unit detects the changed pixel located at the same position in the main scanning direction as the positions of the changed pixel in the main scanning direction, wherein the positions of the changed pixel are consecutive in the sub-scanning direction in the image data obtained by reading the document, and wherein the image data is obtained by reading the white guide member using the image reading unit immediately after reading the document.

3. The image reading device according to claim 1, wherein the changed-pixel detection unit does not detect a changed pixel for an adjacent pixel in the main scanning direction, and wherein the adjacent pixel is adjacent to a pixel having a pixel value less than or equal to a predetermined threshold value in the image data read by the image reading unit.

4. The image reading device according to claim 1, wherein if a number of changed pixels is greater than a predetermined value and each changed pixel detected by the changed-pixel detection unit is consecutive in the main scanning direction in the image data obtained by reading the conveyed document using the image reading unit, then the determination unit determines that the consecutive changed pixels do not correspond to the foreign image.

5. The image reading device according to claim 1,
wherein the determination unit determines: (a) a presence of the foreign image for the image data obtained by reading the white guide member using the image reading unit and (b) the image data obtained by reading the document using the image reading unit, by using image data obtained as a result of the shading correction performed by the image processing unit.

6. The image reading device according to claim 5, wherein the reference image data comprises a white reference value and a black reference value,
wherein the shading correction is performed using the white reference value and the black reference value, and
wherein the white reference value and the black reference value are used to convert digital read image data.

7. The image reading device according to claim 1, wherein the determination unit determines that the positions of the changed pixel correspond to the foreign image, and wherein the determination unit outputs an instruction to execute a foreign image removal process for the changed pixel determined to correspond to the foreign image.

8. An image forming apparatus comprising:
an image reading device that reads a document to generate image data; and
an image forming unit that forms an image of the image data obtained by reading the document using the image reading device,
the image reading device including:
an image reading unit that optically reads, on a line-by-line basis, the document at a predetermined document reading position through a document glass, wherein each line extends in a main scanning direction,
a white guide member disposed at the document reading position so as to face the document glass, wherein the white guide member is read by the image reading unit,
a document conveying unit that conveys the document toward the document reading position, wherein the document conveying unit directs the document to travel between the white guide member and the document glass,
a changed-pixel detection unit that, based on the image data read by the image reading unit, is configured to detect: (a) a changed pixel with a pixel value that differs from a pixel value of an adjacent pixel in the main scanning direction by more than a predetermined value, and (b) a position of the changed pixel in the main scanning direction,
a reference member read by the image reading unit to obtain reference image data for shading correction;
an image processing unit that performs the shading correction on the image data obtained by reading the document using the image reading unit;
a determination unit that determines, after the shading correction, based on the position of the changed pixel in the main scanning direction, whether or not:
positions in the main scanning direction of the changed pixel of a first line of the image data obtained by reading the document conveyed by the document conveying unit, are the same as positions in the main scanning direction of the changed pixel of a last line of the image data obtained by reading the white guide member immediately before reading the document, and/or
positions in the main scanning direction of the changed pixel of a last line of the image data obtained by reading the document conveyed by the document conveying unit are the same as positions in the main scanning direction of the changed pixel of a first line of the image data obtained by reading the white guide member immediately after reading the document,
wherein when the determination unit determines that the positions of the changed pixel are consecutive in the sub-scanning direction, the determination unit determines that the positions of the changed pixel for the image data obtained by reading the document correspond to a foreign image, and
wherein the positions of the changed pixel are determined from the image data obtained by reading the document and the image data obtained by reading the white guide member.

9. The image forming apparatus according to claim 8, wherein the positions of the changed pixel are detected by the changed-pixel detection unit when the image reading unit is reading the conveyed document on the line-by-line basis,
wherein if the positions of the changed pixel are located at the same position in the main scanning direction and are consecutive in the sub-scanning direction, the determination unit determines that the positions of the changed pixel for the image data obtained by reading the document correspond to the foreign image,
wherein the determination is made when the changed-pixel detection unit detects the changed pixel located at the same position in the main scanning direction as the positions of the changed pixel in the main scanning direction,
wherein the positions of the changed pixel are consecutive in the sub-scanning direction in the image data obtained by reading the document, and
wherein the image data is obtained by reading the white guide member using the image reading unit immediately after reading the document.

10. The image forming apparatus according to claim 8, wherein the changed-pixel detection unit does not detect a changed pixel for an adjacent pixel in the main scanning direction, and wherein the adjacent pixel is adjacent to a pixel having a pixel value less than or equal to a predetermined threshold value in the image data read by the image reading unit.

11. The image forming apparatus according to claim 8, wherein if a number of changed pixels is greater than a predetermined value and each changed pixel detected by the changed-pixel detection unit is consecutive in the main scanning direction in the image data obtained by reading the conveyed document using the image reading unit, then the determination unit determines that the consecutive changed pixels do not correspond to the foreign image.

12. The image forming apparatus according to claim 8, wherein the determination unit determines: (a) a presence of the foreign image for the image data obtained by reading the white guide member using the image reading unit and (b) the image data obtained by reading the document using the image reading unit, by using image data obtained as a result of the shading correction performed by the image processing unit.

13. The image forming apparatus according to claim 12, wherein the reference image data comprises a white reference value and a black reference value,
wherein the shading correction is performed using the white reference value and the black reference value, and
wherein the white reference value and the black reference value are used to convert digital read image data.

14. The image forming apparatus according to claim 8, wherein the determination unit determines that the positions of the changed pixel correspond to the foreign image, and wherein the determination unit outputs an instruction to execute a foreign image removal process for the changed pixel determined to correspond to the foreign image.

15. A computer-implemented method comprising:
reading, on a line-by-line basis, a document at a predetermined document reading position through a document glass, wherein each line extends in a main scanning direction;
disposing a white guide member at the document reading position so as to face the document glass, wherein the white guide member is read;
conveying the document toward the document reading position, wherein the document is directed to travel between the white guide member and the document glass;
based on image data obtained from reading the document, detecting: (a) a changed pixel with a pixel value that differs from a pixel value of an adjacent pixel in the main scanning direction by more than a predetermined value, and (b) a position of the changed pixel in the main scanning direction;
determining a reference member to obtain reference image data for shading correction,
performing the shading correction on the image data obtained by reading the document,
after the shading correction, based on the position of the changed pixel in the main scanning direction, determining whether or not:
positions in the main scanning direction of the changed pixel of a first line of the image data obtained by reading the document and are the same as positions in the main scanning direction of the changed pixel of a last line of the image data obtained by reading the white guide member immediately before reading the document, and/or
positions in the main scanning direction of the changed pixel of a last line of the image data obtained by reading the document conveyed by the document conveying unit are the same as positions in the main scanning direction of the changed pixel of a first line of the image data obtained by reading the white guide member immediately after reading the document,
wherein when the positions of the changed pixel are consecutive in the sub-scanning direction, the positions of the changed pixel for the image data obtained by reading the document are determined to correspond to a foreign image, and
wherein the positions of the changed pixel are determined from the image data obtained by reading the document and the image data obtained by reading the white guide member.

16. The computer-implemented method according to claim 15, wherein the positions of the changed pixel are detected when the conveyed document is read on the line-by-line basis,
wherein if the positions of the changed pixel are located at the same position in the main scanning direction and are consecutive in the sub-scanning direction, then the positions of the changed pixel for the image data obtained by reading the document correspond to the foreign image,
wherein the determination is made when the changed pixel located at the same position in the main scanning direction is detected as the position of the changed pixel in the main scanning direction,
wherein the positions of the changed pixel are consecutive in the sub-scanning direction in the image data obtained by reading the document, and
wherein the image data is obtained by reading the white guide member immediately after reading the document.

17. The computer-implemented method according to claim 15, wherein a changed pixel is not detected for an adjacent pixel in the main scanning direction, and wherein the adjacent pixel is adjacent to a pixel having a pixel value less than or equal to a predetermined threshold value in the image data read.

18. The computer-implemented method according to claim 15, wherein if a number of changed pixels is greater than a predetermined value and each changed pixel detected is consecutive in the main scanning direction in the image data obtained by reading the conveyed document, then the consecutive changed pixels do not correspond to the foreign image.

19. The computer-implemented method according to claim 15, further comprising:
determining at least one of the following: (a) a presence of the foreign image for the image data obtained by reading the white guide member and (b) the image data obtained by reading the document, by using image data obtained as a result of the shading correction.

20. The computer-implemented method according to claim 19, wherein the reference image data comprises a white reference value and a black reference value,
wherein the shading correction is performed using the white reference value and the black reference value, and
wherein the white reference value and the black reference value are used to convert digital read image data.

* * * * *